(12) United States Patent
Inoue

(10) Patent No.: US 9,232,282 B2
(45) Date of Patent: Jan. 5, 2016

(54) SUBSCRIBER LINE TERMINAL, CONTROL METHOD, AND CONTROL METHOD FOR PON SYSTEM

(75) Inventor: Toru Inoue, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 203 days.

(21) Appl. No.: 13/983,148

(22) PCT Filed: Nov. 8, 2011

(86) PCT No.: PCT/JP2011/075697
§ 371 (c)(1),
(2), (4) Date: Aug. 1, 2013

(87) PCT Pub. No.: WO2012/111200
PCT Pub. Date: Aug. 23, 2012

(65) Prior Publication Data
US 2013/0318566 A1      Nov. 28, 2013

(30) Foreign Application Priority Data

Feb. 15, 2011 (JP) .................................. 2011-029859

(51) Int. Cl.
| | |
|---|---|
| H04J 3/14 | (2006.01) |
| H04N 21/61 | (2011.01) |
| H04L 12/28 | (2006.01) |
| H04Q 11/00 | (2006.01) |
| H04B 10/27 | (2013.01) |

(52) U.S. Cl.
CPC ........... *H04N 21/6106* (2013.01); *H04B 10/27* (2013.01); *H04L 12/2885* (2013.01); *H04Q 11/0067* (2013.01); *H04Q 2011/0081* (2013.01)

(58) Field of Classification Search
USPC .................. 370/252; 725/119; 398/25, 66
See application file for complete search history.

(56) References Cited

U.S. PATENT DOCUMENTS

| | | | | |
|---|---|---|---|---|
| 7,835,268 | B2 * | 11/2010 | Tanaka ........................ | 370/216 |
| 8,249,458 | B2 * | 8/2012 | Mizutani et al. .............. | 398/100 |
| 8,301,867 | B1 * | 10/2012 | Mazuk et al. .................... | 712/36 |
| 8,422,887 | B2 * | 4/2013 | Haramaty et al. ............ | 398/151 |
| 2007/0058973 | A1 * | 3/2007 | Tanaka .............................. | 398/1 |
| 2009/0245792 | A1 * | 10/2009 | Oishi et al. ...................... | 398/66 |
| 2010/0166419 | A1 * | 7/2010 | Elmoalem et al. ................ | 398/2 |
| 2011/0085799 | A1 * | 4/2011 | Mizutani ......................... | 398/37 |

(Continued)

FOREIGN PATENT DOCUMENTS

| | | |
|---|---|---|
| JP | 8-32580 A | 2/1996 |
| JP | 2001-257735 A | 9/2001 |
| JP | 2006-262129 A | 9/2006 |

(Continued)

*Primary Examiner* — Phuc Tran
(74) *Attorney, Agent, or Firm* — Drinker Biddle & Reath LLP

(57) ABSTRACT

There is provided a technique that enables a process to be performed smoothly between two processing units of an OLT after rebooting of one of the processing units even in the case where a process by the processing unit is temporarily halted. An upper processing unit can be temporarily halted when updating firmware. A basic communication unit (lower processing unit) is configured to maintain its operation even when the upper processing unit is temporarily halted. When an event occurs during a halt period of the upper processing unit, a matching unit matches a management state stored in a first storage unit with a management state stored in a second storage unit after the halt period of the upper processing unit.

10 Claims, 17 Drawing Sheets

(56) References Cited

U.S. PATENT DOCUMENTS

2011/0188849 A1* 8/2011 Haramaty et al. ............. 398/25
2011/0317998 A1* 12/2011 Fujimura ........................ 398/25

FOREIGN PATENT DOCUMENTS

| JP | 2010-166488 A | 7/2010 |
| JP | 2010-252176 A | 11/2010 |

* cited by examiner

SUBSCRIBER LINE TERMINAL, CONTROL METHOD, AND CONTROL METHOD FOR PON SYSTEM

TECHNICAL FIELD

The present invention relates to a subscriber line terminal, a control method, and a control method for a PON system.

BACKGROUND ART

A PON (Passive Optical Network) is one of configurations for implementing FTTH (Fiber To The Home) that provides each home with network access service through an optical fiber. A feature of the PON lies in that optical access service can be provided at low cost by making communication with a part of the optical fiber, which connects between a home-side device (an optical network unit (ONU)) and a subscriber line terminal (an optical line terminal (OLT)), being commonly used.

In a network system including the FTTH, a new function is frequently required to be added and a function to solve a problem is frequently required. A method for implementing such functions is to download a software program to be executed by a CPU (Central Processing Unit) in a network device, or to download design data of an FPGA (Field Programmable Gate Array) in the network device. It should be noted that a term "firmware" herein includes a program code to be executed by a CPU provided in a communication device (irrespective of the OLT and the ONU), as well as a configuration code of the FPGA.

For example, Patent Document 1 (Japanese Patent Laying-Open No. 2010-252176) discloses a communication system configured such that an OLT broadcasts, to a plurality of ONUs, data that should be downloaded by the plurality of ONUs. The data that should be downloaded by the plurality of ONUs can include firmware for updating firmware embedded in each of the plurality of ONUs. According to the above-described configuration, the download by the plurality of ONUs connected to the PON can be done in a short time.

CITATION LIST

Patent Document

PTD 1: Japanese Patent Laying-Open No. 2010-252176

SUMMARY OF INVENTION

Technical Problem

Patent Document 1 (Japanese Patent Laying-Open No. 2010-252176) discloses a method for updating the firmware of each of the ONUs but does not disclose a specific method for updating firmware of the OLT.

In order to update the firmware of the OLT, the following method can be contemplated, for example. That is, new firmware is externally provided to the OLT. Then, the OLT stores the new firmware in a nonvolatile memory provided in the OLT. By rebooting the OLT, the new firmware is read from the nonvolatile memory. In this way, the firmware of the OLT is updated.

However, during the updating of the firmware of the OLT, the process by the OLT may be halted. If the process by the OLT is halted, communication by the ONU and terminals operating under the ONU may be halted.

In recent years, in an access system network, not only data communication via the Internet, but also various types of communications are performed such as VoIP (Voice over Internet Protocol) service and distribution of video data. Accordingly, influence of halt of communications is becoming larger.

Hence, it is considered preferable to update the firmware of the OLT while continuing data communication between the OLT and the ONU. One solution is to divide the configuration of the OLT into a basic communication unit and an upper processing unit and update firmware of the upper processing unit. The basic communication unit performs data communication, whereas the upper processing unit performs functions other than the data communication. However, the upper processing unit recognizes a state of the communication system in accordance with a notified event from the basic communication unit, and sends an instruction to the basic communication unit in accordance with the event as required. Therefore, when an event occurs during a process for updating the firmware of the upper processing unit, the upper processing unit cannot detect the event.

In such a case, there is a mismatch between the state of the network managed (recognized) by the upper processing unit and the state of the network managed (recognized) by the basic communication unit. In addition, the basic communication unit cannot receive, from the upper processing unit, an instruction for the event detected by the basic communication unit.

The present invention has an object to provide a technique that enables a process to be performed smoothly between two processing units of an OLT after rebooting of one of the processing units in the case where a process by the processing unit is temporarily halted.

Solution to Problem

A subscriber line terminal in an aspect of the present invention is a subscriber line terminal forming a network system together with a home-side device. The subscriber line terminal includes: an upper layer processing unit handling an upper layer of a hierarchical communication protocol, having a first storage unit for storing a state of the network system, and updating the state of the network system stored in the first storage unit when a notification of an event having occurred in the network system is provided; and a lower layer processing unit handling a lower layer of the hierarchical communication protocol, having a second storage unit for storing a state of the network system, providing a notification of an event to the upper layer processing unit when detecting occurrence of the event, and updating the state of the network system stored in the second storage unit based on the event. The upper layer processing unit can be temporarily halted whereas the lower layer processing unit is configured to maintain an operation thereof even when the upper layer processing unit is temporarily halted. The subscriber line terminal further includes a matching unit matching the state stored in the first storage unit with the state stored in the second storage unit after a halt period of the upper layer processing unit when an event occurs during the halt period of the upper layer processing unit.

According to the configuration described above, after the halt period of the upper layer processing unit is ended, the state of the network stored in the first storage unit provided in the upper layer processing unit can coincide with the state of the network stored in the second storage unit provided in the lower layer processing unit. Accordingly, a process can be smoothly performed between the upper layer processing unit and the lower layer processing unit. For example, as with the normal state, the upper layer processing unit can send, to the lower layer processing unit, an instruction for an event detected by the lower layer processing unit.

Preferably, when the upper layer processing unit is temporarily halted, the matching unit sends an instruction to the lower layer processing unit so as to accumulate an event having occurred during the halt period of the upper layer processing unit. After the halt period of the upper layer processing unit, the matching unit sends an instruction to the lower layer processing unit so as to provide the upper layer processing unit with a notification of the event accumulated.

According to the configuration described above, after the halt period of the upper layer processing unit is ended, the state of the network stored in the first storage unit provided in the upper layer processing unit can coincide with the state of the network stored in the second storage unit provided in the lower layer processing unit. Accordingly, mismatch in management state between the upper layer processing unit and the lower layer processing unit can be prevented in advance.

Preferably, when the upper layer processing unit is temporarily halted, the matching unit sends an instruction to the lower layer processing unit so as to halt detection for the event. After the halt period of the upper layer processing unit, the matching unit sends an instruction to the lower layer processing unit so as to resume the detection for the event.

According to the configuration described above, after the halt period of the upper layer processing unit is ended, the state of the network stored in the first storage unit provided in the upper layer processing unit can coincide with the state of the network stored in the second storage unit provided in the lower layer processing unit. Accordingly, mismatch in management state between the upper layer processing unit and the lower layer processing unit can be prevented in advance.

Preferably, after the halt period of the upper layer processing unit, the matching unit sends an instruction to the lower layer processing unit so as to provide the upper layer processing unit with a notification of the state of the network system stored in the second storage unit.

According to the configuration described above, after the halt period of the upper layer processing unit is ended, the state of the network stored in the first storage unit provided in the upper layer processing unit can coincide with the state of the network stored in the second storage unit provided in the lower layer processing unit. Even when the state of the network stored by the upper layer processing unit and the state of the network managed by the lower layer processing unit are different from each other during the halt period of the upper layer processing unit, such a difference in state can be eliminated after the halt period of the upper layer processing unit.

Preferably, the network system is a passive optical network system. A protocol of the lower layer is MPCP or OAM. A protocol of the upper layer is a protocol belonging to an upper layer higher than the MPCP and the OAM.

According to the configuration described above, even when the upper layer processing unit is temporarily halted in the PON system in which the communication between the ONU and the OLT needs to be always maintained, basic communication between the OLT and the ONU can be maintained.

Preferably, when the lower layer processing unit provides the upper layer processing unit with a notification of an event that another home-side device has been additionally connected to the network system, the upper layer processing unit instructs the lower layer processing unit to establish a communication link between the subscriber line terminal and the another home-side device.

According to the configuration described above, the upper layer processing unit can recognize the state that the ONU has been additionally connected to the network system. Further, in accordance with the instruction from the upper layer processing unit to the lower layer processing unit, the communication link can be established between the ONU and the OLT.

Preferably, the subscriber line terminal distributes multi-channel video data, which is received via an upper network, to the home-side device. The upper layer processing unit receives, from the home-side device, a request for selecting video data of one channel from the multi-channel video data, and performs a process of including the home-side device as a distribution destination of the video data of the one channel.

According to the configuration described above, the video data of the channel corresponding to the request sent from the home-side device can be distributed to the home-side device. Even in the case where the upper layer processing unit is temporarily halted, channels can be switched in accordance with the user's request. Further, by shortening the halt period, time lag can be shortened when the user switches channels.

Preferably, the halt period includes a period for updating firmware embedded in the upper layer processing unit to new firmware.

According to the configuration described above, even when the upper layer processing unit is temporarily halted to update the firmware, communication between the OLT and the ONU can be maintained. Further, after rebooting the upper layer processing unit, the management state of the upper layer processing unit and the management state of the lower layer processing unit can be matched with each other.

A control method in another aspect of the present invention is a control method for managing a network system in a subscriber line terminal. The control method includes the steps of: performing an upper layer process regarding an upper layer of a hierarchical communication protocol; performing a lower layer process regarding a lower layer of the hierarchical communication protocol; and providing a notification of an event having occurred in the network system from a processing unit, which performs the lower layer process, to a processing unit, which performs the upper layer process. The lower layer process, the upper layer process, and the notification of the event are performed during a period in which the upper layer process is able to be performed. The control method further includes the step of performing the lower layer process during a period in which the upper layer process is not able to be performed, and after start of a period in which the upper layer process is able to be performed, attaining the same state as a state of a case where the upper layer process and the notification of the event are performed during the period.

According to the configuration described above, even when the process by the upper layer cannot be temporarily performed, the state of the network managed by the unit that performs the process of the upper layer and the state of the network managed by the unit that performs the process of the lower layer can coincide with each other after the process by the upper layer becomes executable again.

A control method for a PON system in still another aspect of the present invention is a control method for a PON system formed of a subscriber line terminal and a plurality of home-side devices connected to the subscriber line terminal via a passive optical network. The control method includes the steps of: at least one of the plurality of home-side devices transmitting, to the subscriber line terminal, a request for selecting video data of one channel from multi-channel video data distributed from the subscriber line terminal to the passive optical network; an upper layer processing unit of the subscriber line terminal receiving the request; including the home-side device having transmitted the request, as a distribution destination of the video data of the one channel among the multi-channel video data sent from an upper network to the subscriber line terminal; the subscriber line terminal distributing the multi-channel video data to the passive optical network; the home-side device having transmitted the request selectively receiving the video data of the one channel corresponding to the request from among the multi-channel video data; and when the request is generated during a period in which the upper layer processing unit is not able to receive the request, a lower layer processing unit of the subscriber line terminal receiving the request generated, and after start of a period in which the upper layer processing unit is able to receive the request, the lower layer processing unit attaining the same state as a state of a case where the upper layer processing unit receives the request generated.

According to the configuration described above, even when the upper layer processing unit is temporarily halted in the PON system in which the communication between the ONU and the OLT needs to be always maintained, basic communication between the OLT and the ONU can be maintained. Further, even when a request for selection of a channel has been transmitted from an ONU while the upper layer processing unit cannot perform its process, the same state can be attained as the state of the case where the upper layer processing unit receives the request from the user during the period in which the upper layer processing unit can perform its process. Accordingly, channels can be switched upon request at the user side.

Advantageous Effects of Invention

According to the present invention, a process can be performed smoothly between two processing units of an OLT after rebooting of one of the processing units in the case where a process by the processing unit is temporarily halted.

DESCRIPTION OF EMBODIMENTS

Figure 1:
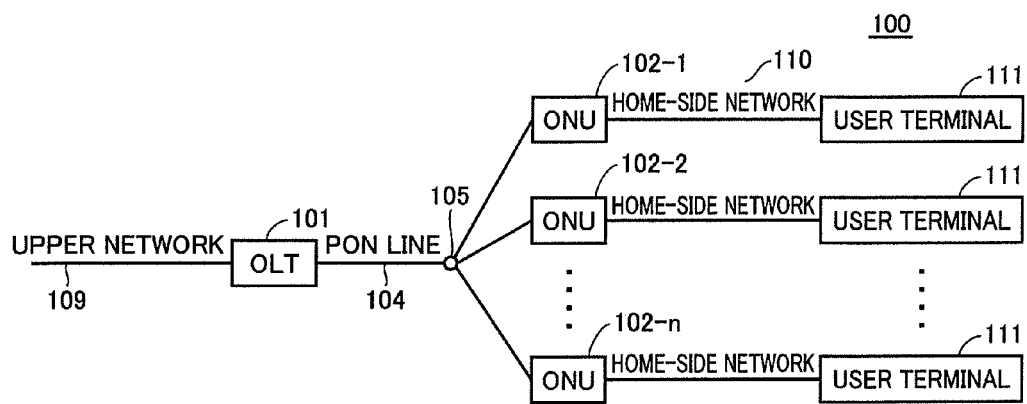
FIG. 1 is a block diagram showing a schematic configuration of a PON system 100 in an embodiment of the present invention.

The following describes an embodiment of the present invention with reference to figures. It should be noted that the same or corresponding portions in the figures are given the same reference characters and are not described repeatedly.

FIG. 1 is a block diagram showing a schematic configuration of a PON system 100 in an embodiment of the present invention. Referring to FIG. 1, PON system 100 includes an OLT 101, ONUs 102-1, 102-2, . . . , 102-n, a PON line 104, and a splitter 105.

OLT 101 is set in, for example, a telephone central office. Each of ONUs 102-1 to 102-n is set in the home of a member of a network access service, for example.

User terminals 111 are connected to ONUs 102-1 to 102-n. The number of user terminals 111 connected to each ONU 102 is not particularly limited. For example, a plurality of user terminals may be connected to one ONU. Also, types of user terminals 111 are not particularly limited.

PON line 104 is composed of an optical fiber. An optical signal transmitted from OLT 101 passes through PON line 104, and is branched by splitter 105 into ONUs 102-1 to 102-n. On the other hand, optical signals transmitted from ONUs 102-1 to 102-n are converged by splitter 105 and are sent to OLT 101 via PON line 104. Splitter 105 passively branches or multiplexes input signals without particularly requiring external power supply.

OLT 101 receives data via upper network 109, and outputs the data to PON line 104. According to the physical configuration of the PON, all of ONUs 102-1 to 102-n can receive data transmitted from OLT 101. Hence, OLT 101 inserts an identifier LLID (Logical Link ID) in a preamble portion of a transmission frame so as to identify an ONU that should receive the transmission frame. Each of the ONUs verifies the LLID included in the frame received from OLT 101, against its LLID having been notified by OLT 101 in advance. When the LLID included in the frame coincides with its LLID, the ONU receives the frame. Otherwise, the ONU discards the frame.

Meanwhile, the optical signals transmitted from the ONUs are converged at splitter 105. Accordingly, after the convergence at splitter 105, it is required to perform control to prevent collision of the signals (uplink signals) transmitted from the ONUs. Based on control frames (reports) transmitted from ONUs 102-1 to 102-n, OLT 101 calculates transmission start times and permitted transmission amounts for data accumulated in buffers of ONUs 102-1 to 102-n. Next, OLT 101 transmits a control frame (grant), which has an instruction signal inserted therein, to each of ONUs 102-1 to 102-n via PON line 104 and splitter 105.

For example, ONU 102-1 receives an uplink information frame from user terminal 111 via a home-side network 110. ONU 102-1 temporarily accumulates the uplink information frame in a buffer. At a time designated by a grant, ONU 102-1 provides a notification of the length of the data in the buffer thereof to OLT 101 by means of a report. ONU 102-1 receives a grant, which has an instruction signal inserted therein, from OLT 101. Based on the instruction signal, ONU 102-1 transmits the data in the buffer thereof and the report to OLT 101.

Figure 2:
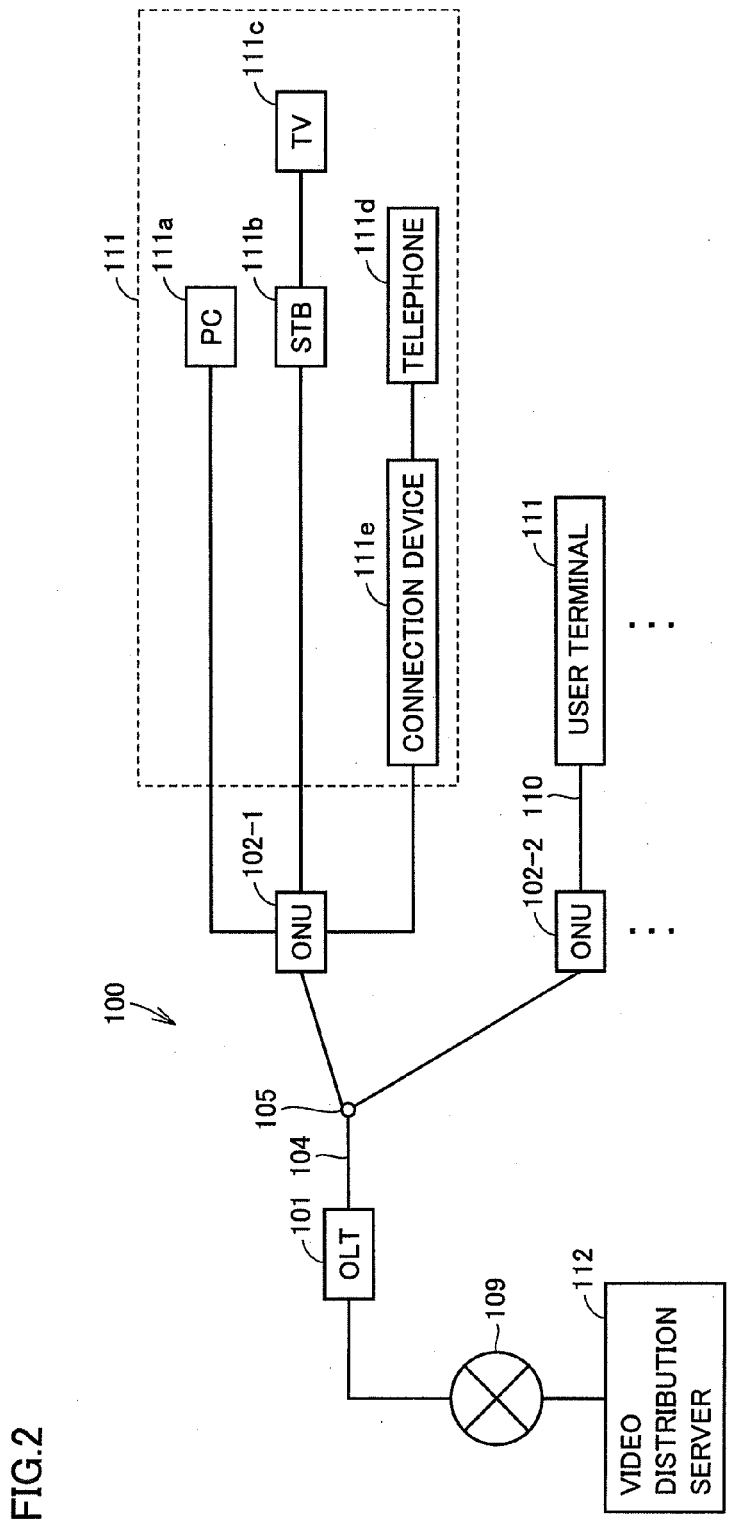
FIG. 2 shows an exemplary configuration of a user terminal connected to an ONU shown in FIG. 1.

FIG. 2 shows an exemplary configuration of the user terminal connected to the ONU shown in FIG. 1. Referring to FIG. 2, user terminal 111 connected to ONU 102-1 includes a personal computer (PC) 111a, a set top box (STB) 111b, a television receiver (TV) 111c, a telephone 111d, and a connection device 111e.

In the exemplary configuration shown in FIG. 2, personal computer 111a, set top box 111b, and connection device 111e (such as an adapter or a router) are connected to ONU 102-1. Television receiver (TV) 111c is connected to ONU 102-1 via set top box 111b.

Meanwhile, a video distribution server 112 is connected to upper network 109 (such as the Internet). Video distribution server 112 provides multi-channel distribution service to a user of television receiver 111c via PON system 100.

Set top box 111b serves as a tuner for selecting the user's desired channel from among many channels. The user selects a channel corresponding to the user's desired program from among the many channels by operating set top box 111b using a remote controller or the like not shown in the figure. In this case, set top box 111b sends a channel selection request to ONU 102-1. ONU 102-1 transmits this channel selection request to OLT 101 via PON line 104.

OLT 101 receives the channel selection request from ONU 102-1. OLT 101 provides an identifier LLID for identifying ONU 102-1, to the video data of the channel corresponding to the channel selection request among the multi-channel video data sent from video distribution server 112 via upper network 109. When OLT 101 outputs the multi-channel video data to PON line 104, ONU 102-1 obtains only the video data having identifier LLID corresponding to ONU 102-1. In this way, the user can view the desired program.

Telephone 111d is connected to ONU 102-1 via connection device 111e. Accordingly, the user can use a call service such as VoIP service.

The configuration of user terminal 111 is not limited to that shown in FIG. 2, and can be modified from the configuration shown in FIG. 2 in accordance with the user's desired service. For example, a device connected to an ONU can be arbitrarily selected. In another example, in order to build home-side network 110, another network device (such as a hub or a router) can be used. In still another example, television receiver 111c may have the function of set top box 111b.

Figure 3:
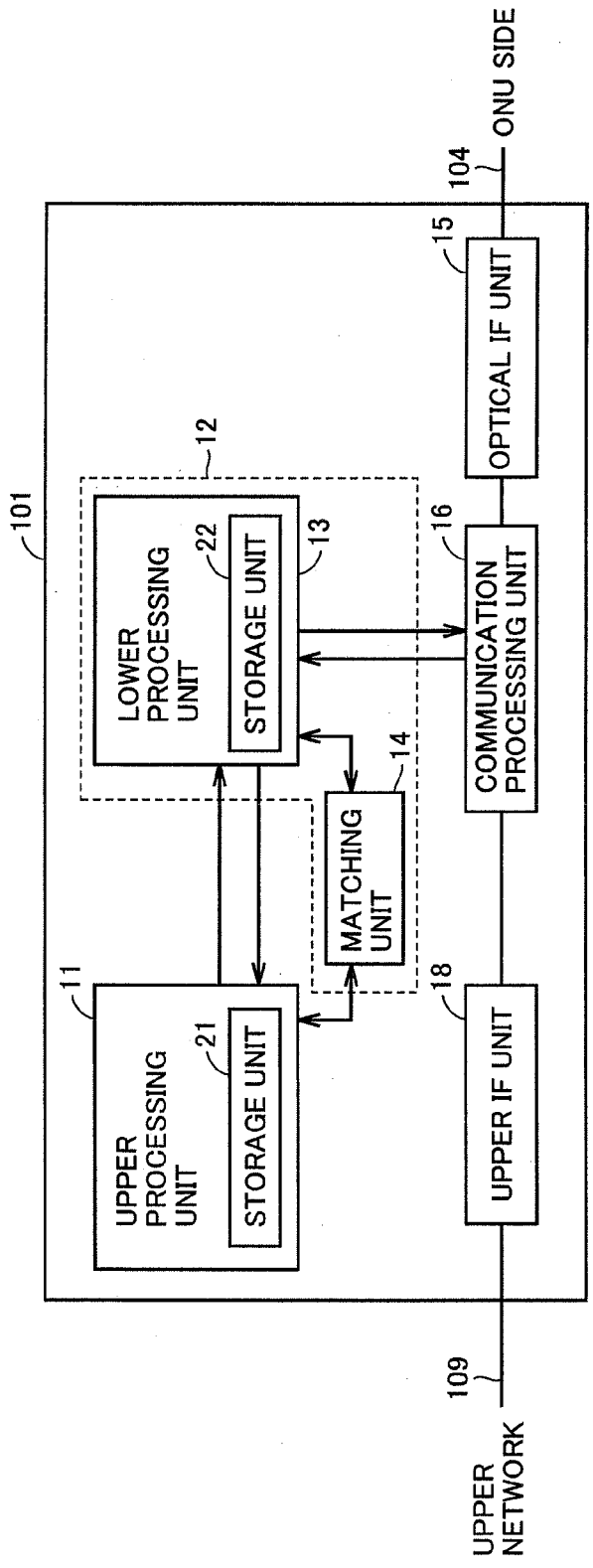
FIG. 3 is a function block diagram of an OLT shown in FIG. 1.

FIG. 3 is a function block diagram of the OLT shown in FIG. 1. Referring to FIG. 3, OLT 101 includes an upper processing unit 11, a basic communication unit 12, an optical interface (IF) unit 15, a communication processing unit 16, and an upper interface (IF) unit 18.

Upper processing unit 11 is an upper layer processing unit that handles upper layers of a hierarchical communication protocol. Basic communication unit 12 includes a lower processing unit 13 and a matching unit 14. Lower processing unit 13 handles lower layers of the hierarchical communication protocol.

In the embodiment of the present invention, the hierarchical communication protocol is a communication protocol that complies with the OSI (Open Systems Interconnection) reference model, and the term "upper layers" refers to a third layer (network layer) and higher layers. On the other hand, the term "lower layers" refers to the first layer (physical layer) and the second layer (data link layer) in the OSI reference model. The protocols of the "lower layers" (particularly, the data link layer) include MPCP (Multi-Point Control Protocol) and OAM (Operations, Administration and Maintenance) protocol.

Upper processing unit 11 and basic communication unit 12 communicate with each other. A protocol used for the communication between upper processing unit 11 and basic communication unit 12 is TCP/IP, for example.

Upper processing unit 11 has a storage unit 21 that holds information regarding a state of the PON system. When a notification of an event is provided from lower processing unit 13, upper processing unit 11 updates the state stored in storage unit 21.

Basic communication unit 12 has a storage unit 22 that holds information regarding the state of the PON system. This storage unit 22 is configured as a portion of lower processing unit 13. However, storage unit 22 may be provided separately from lower processing unit 13. Lower processing unit 13 detects an event, and provides a notification of the event to upper processing unit 11. In accordance with the detected event, lower processing unit 13 updates the state.

When lower processing unit 13 receives, from upper processing unit 11, an instruction for the event for which lower processing unit 13 has provided the notification to upper processing unit 11, lower processing unit 13 performs a process in accordance with the instruction.

As one example of the process, the following describes a case where an ONU is additionally connected to PON system 100. In accordance with the MPCP, lower processing unit 13 detects that an ONU has been additionally connected. Specifically, lower processing unit 13 detects such an event that the ONU has been additionally connected. In this case, lower processing unit 13 stores, in storage unit 22, information indicating that the new ONU has been connected. Then, lower processing unit 13 provides a notification of the event to upper processing unit 11.

When upper processing unit 11 receives the notification of the event from lower processing unit 13, upper processing unit 11 stores, in storage unit 21, the information indicating that the new ONU has been connected. Next, upper processing unit 11 assigns an LLID for the ONU, and sends an instruction to lower processing unit 13 so as to provide a notification of the LLID to the new ONU. In this way, lower processing unit 13 provides the notification of the LLID to the new ONU.

Further, upper processing unit 11 determines transmission band and transmission timing for an uplink signal to be transmitted from the new ONU to the OLT, and instructs to provide notifications of the transmission band and the transmission timing to the new ONU. In accordance with the instruction from upper processing unit 11, lower processing unit 13 provides the notifications of the transmission band and the transmission timing to the new ONU.

Further, in accordance with the OAM protocol, lower processing unit 13 monitors the ONU and the PON line. For example, when lower processing unit 13 detects a fault of the PON line as an event, lower processing unit 13 provides a notification of the event to upper processing unit 11. In this case, for example, upper processing unit 11 provides the notification of the event (fault in the PON line) to a terminal device of an operator who maintains and operates the PON system, via upper network 109.

As described above, each of upper processing unit 11 and lower processing unit 13 has a storage unit for holding the state of the network. Each of the storage units (storage units 21, 22) holds the management state in the form of, for example, a database. Accordingly, each of upper processing unit 11 and lower processing unit 13 can manage the state of the network. Because the storage units are respectively provided in upper processing unit 11 and lower processing unit 13, processes can be independent for each module. Accordingly, processes for communication control can be hierarchized into the upper layer and the lower layer.

Optical interface unit 15 is connected to PON line 104 (optical fiber). Optical interface unit 15 receives an optical signal (uplink signal) from PON line 104 and converts it to an electric signal, and receives an electric signal (downlink signal), converts it into an optical signal, and sends it to PON line 104.

When communication processing unit 16 determines that the uplink signal sent from the ONU to OLT 101 is a data signal, communication processing unit 16 performs various types of processes for transmitting the data signal from OLT 101 to upper network 109. Further, communication processing unit 16 performs various types of processes for transmitting, to the ONU via PON line 104, the downlink signal (data signal) sent from upper network 109 to OLT 101.

Further, when a control frame is transmitted from the ONU to OLT 101, communication processing unit 16 transmits the control frame to basic communication unit 12 (lower processing unit 13). Further, when a control frame should be transmitted from OLT 101 to the ONU, communication processing unit 16 receives, from basic communication unit 12 (lower processing unit 13), the control frame that should be sent to the ONU, and performs a process for sending the control frame to PON line 104. This "control frame" includes an MPCP frame and an OAM frame.

In upper processing unit 11, firmware is embedded. In order to add a new function and solve a problem, the firmware of upper processing unit 11 might be updated to new firmware. During a period of updating the firmware of upper processing unit 11, the process by upper processing unit 11 is halted. On the other hand, while the process by upper processing unit 11 is temporarily halted, operation of lower processing unit 13 continues. Accordingly, data communication between the OLT and the ONU can be prevented from being halted.

However, when an event occurs during the halt of upper processing unit 11, lower processing unit 13 can update the state stored in storage unit 22, but upper processing unit 11 cannot update the management state held by storage unit 21. Accordingly, when upper processing unit 11 is rebooted, the state managed by the upper processing unit 11 (i.e., information stored in storage unit 21) may not coincide with the state managed by lower processing unit 13 (i.e., information stored in storage unit 22).

In the case where an event occurs during temporary halt of upper processing unit 11, matching unit 14 matches, after the halt period of upper processing unit 11, the management state stored in storage unit 21 of upper processing unit 11 with the management state stored in storage unit 22 of lower processing unit 13. A specific process by matching unit 14 will be described later in detail.

Figure 4:
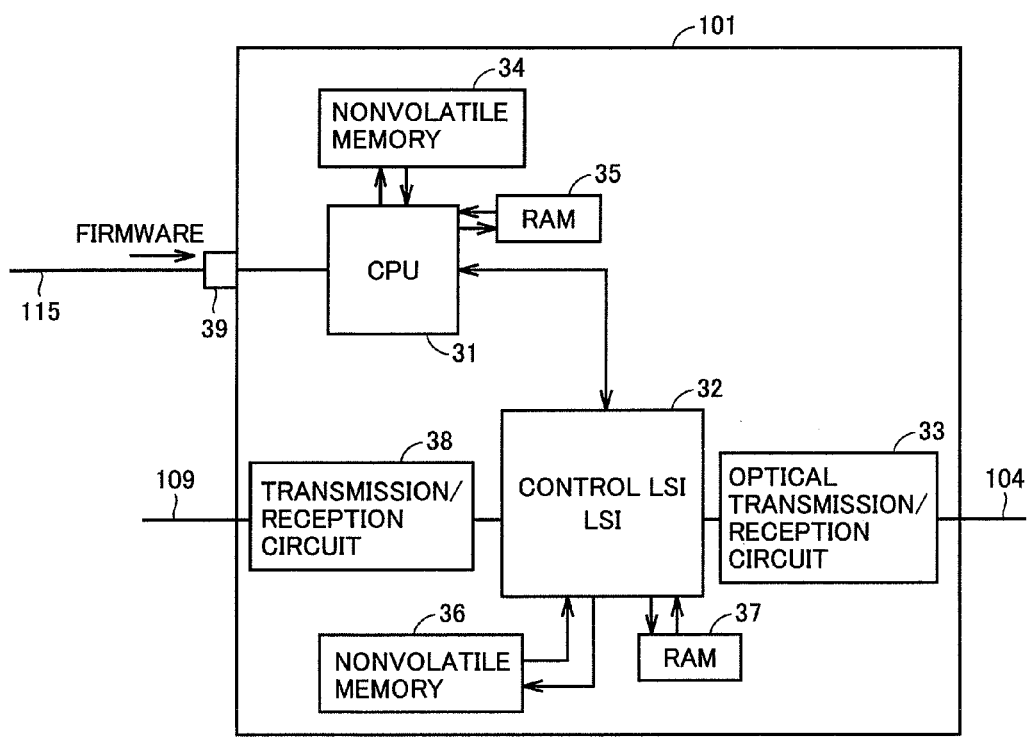
FIG. 4 schematically shows an exemplary hardware configuration of the OLT shown in FIG. 3.

FIG. 4 schematically shows an exemplary hardware configuration of the OLT shown in FIG. 3. Referring to FIG. 4, OLT 101 includes a CPU 31, a control LSI (Large Scale Integrated circuit) 32, an optical transmission/reception circuit 33, a nonvolatile memory 34, a RAM 35, a nonvolatile memory 36, a RAM 37, and a transmission/reception circuit 38.

In CPU 31, firmware is embedded. By the CPU performing a process in accordance with the firmware, CPU 31 implements upper processing unit 11 shown in FIG. 3.

By updating the firmware of CPU 31, OLT 101 can be flexibly provided with an advanced function or an extended function. The new firmware is sent to management interface 39 via network 115 in accordance with a protocol such as FTP. When receiving the new firmware via management interface 39, CPU 101 stores the firmware in nonvolatile memory 34.

In order to update the firmware embedded in CPU 101 to the new firmware, CPU 101 is rebooted. For example, when CPU 101 receives a command sent from a computer connected to network 115, CPU 101 is rebooted and reads the firmware stored in nonvolatile memory 34. In this way, the firmware is updated.

During a process by CPU 31, data is temporarily stored in RAM 35. For example, storage unit 21 can be implemented by RAM 35. In order to prevent loss of information stored in storage unit 21, the information stored in storage unit 21 may be stored in nonvolatile memory 34 or another nonvolatile memory at an appropriate timing by CPU 31.

Control LSI 32 implements, for example, basic communication unit 12 and communication processing unit 16. During a process by control LSI 32, data is temporarily stored in RAM 37. For example, storage unit 22 can be implemented by RAM 37. Further, the information stored in storage unit 22 may be stored in nonvolatile memory 36.

Optical transmission/reception circuit 33 implements optical interface unit 15. Likewise, transmission/reception circuit 38 implements upper interface unit 18.

Figure 5:
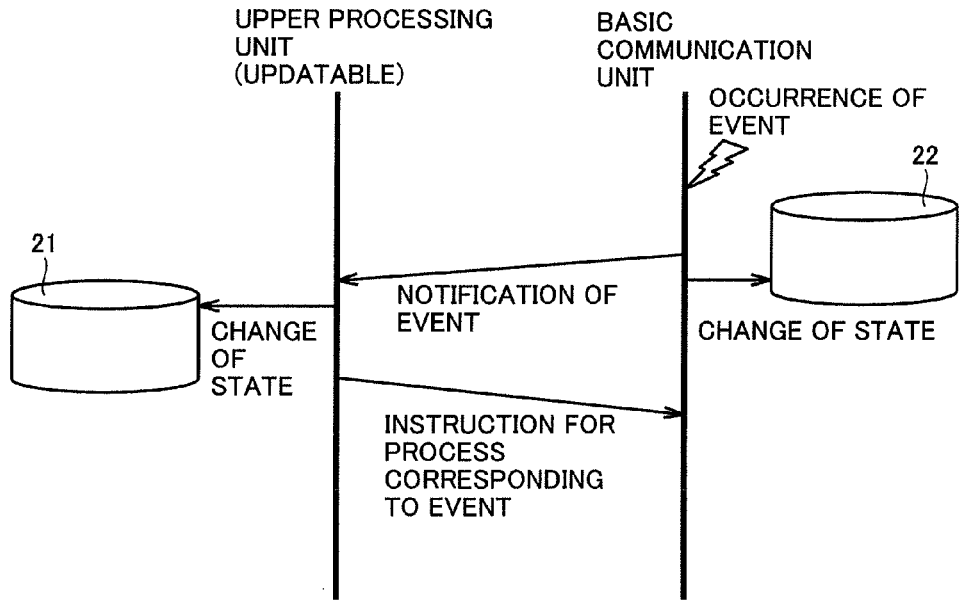
FIG. 5 is a sequence diagram illustrating a process by the OLT when an event occurs while the OLT is in a normal state.

FIG. 5 is a sequence diagram illustrating a process by the OLT when an event occurs while the OLT is in a normal state. Here, the "normal state" corresponds to a case where the operation of upper processing unit 11 is not temporarily halted (in a specific example, a case where there is no update of firmware). Referring to FIG. 5, when an event occurs, basic communication unit 12 detects the event. Basic communication unit 12 provides a notification of the event to upper processing unit 11, and stores, in storage unit 22, information regarding the state of PON system 100, which should be managed by basic communication unit 12. Accordingly, the database constructed by storage unit 22 is updated, thereby changing the state managed by basic communication unit 12 (state of PON system 100).

On the other hand, when receiving the notification of the event from basic communication unit 12, upper processing unit 11 reflects the notification in the database constructed by storage unit 21. Accordingly, the database of upper processing unit 11 is updated, thereby updating the state managed by upper processing unit 11 (state of PON system 100). Further, upper processing unit 11 instructs, as required, basic communication unit 12 to perform a process corresponding to the event for which the notification has been provided to upper processing unit 11.

As described above, in the normal state, when basic communication unit 12 detects the event, the database included in basic communication unit 12 and the database included in upper processing unit 11 are updated substantially in synchronization with each other. Hence, in the normal state, the state managed by basic communication unit 12 and the state managed by upper processing unit 11 coincide with each other.

Figure 6:
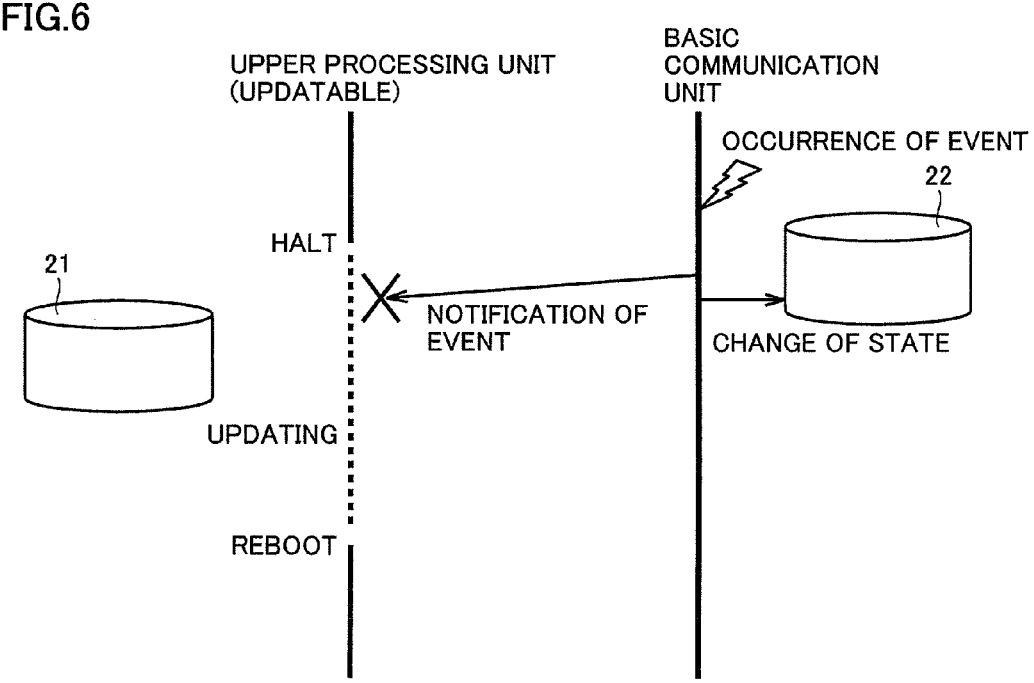
FIG. 6 is a sequence diagram showing a problem that can take place while updating the firmware of the upper processing unit.

FIG. 6 is a sequence diagram showing a problem that can take place while updating the firmware of the upper processing unit. The following problem can take place when basic communication unit 12 does not have the function of matching unit 14.

Referring to FIG. 6, basic communication unit 12 detects an event. Basic communication unit 12 provides a notification of the event to upper processing unit 11. However, the process by upper processing unit 11 is halted due to the updating of the firmware. Accordingly, the notification from basic communication unit 12 cannot be received by upper processing unit 11. As a result, the information held by storage unit 21 is not updated. Hence, there is a mismatch between the state managed by basic communication unit 12 and the state managed by upper processing unit 11 after rebooting upper processing unit 11. Further, an instruction for a process corresponding to the event is not sent to basic communication unit 12.

To address this, according to the embodiment of the present invention, when an event occurs during temporary halt of upper processing unit 11, matching unit 14 matches, after the halt period of upper processing unit 11, the management state stored in storage unit 21 of upper processing unit 11 with the management state stored in storage unit 22 of lower processing unit 13. Accordingly, after rebooting upper processing unit 11, the same state is attained as a state of a case where the process of the upper layer and the notification of the event are performed. Thus, a process can be performed smoothly between upper processing unit 11 and basic communication unit 12. For example, as with the normal state, upper processing unit 11 can send an instruction for the event detected by basic communication unit 12, to basic communication unit 12. The following fully describes a process performed by matching unit 14 for each of embodiments.

First Embodiment

Figure 7:
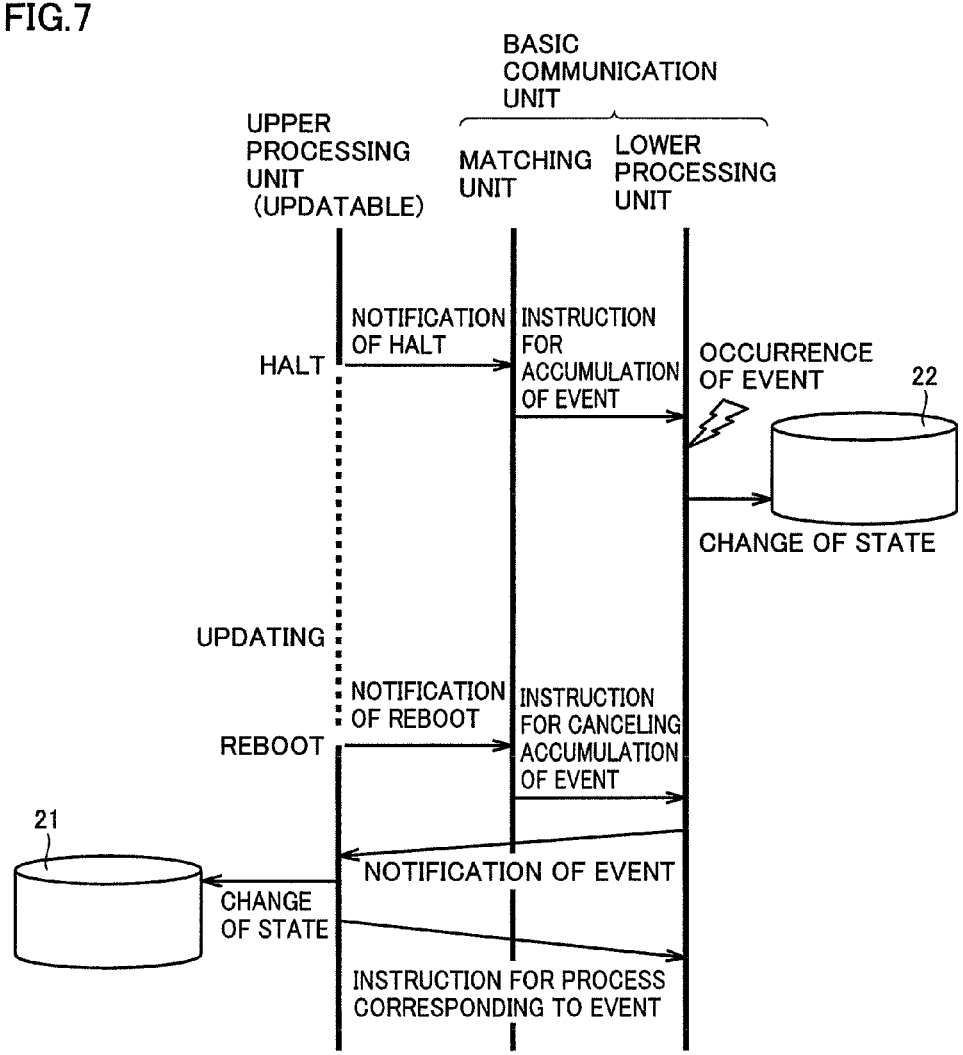
FIG. 7 is a sequence diagram for illustrating a process by the OLT according to a first embodiment.

FIG. 7 is a sequence diagram for illustrating a process by the OLT according to a first embodiment. Referring to FIG. 3 and FIG. 7, prior to halting the process, upper processing unit 11 provides a notification of halt of upper processing unit 11 to matching unit 14. With the notification from upper processing unit 11, matching unit 14 detects that upper processing unit 11 is to be halted. Accordingly, matching unit 14 instructs lower processing unit 13 to accumulate an event for which a notification should be provided to upper processing unit 11. With the detection of the event, lower processing unit 13 updates the database of the basic communication unit 12 side (database constructed by storage unit 22), and accumulates the event for which a notification should be provided to upper processing unit 11.

The firmware of upper processing unit 11 is updated, and upper processing unit 11 is rebooted. Upper processing unit 11 notifies matching unit 14 that upper processing unit 11 has been rebooted. With the notification from upper processing unit 11, matching unit 14 detects that upper processing unit 11 has been rebooted. Accordingly, matching unit 14 instructs lower processing unit 13 to cancel the accumulation of event, and to provide a notification of the accumulated event to upper processing unit 11.

Lower processing unit 13 provides upper processing unit 11 with a notification of the event accumulated during the halt period of upper processing unit 11 (i.e., update period of the firmware). Thereafter, as with the process shown in FIG. 5, upper processing unit 11 updates the database of the upper processing unit 11 side (the database constructed by storage unit 21), in accordance with the event for which the notification has been provided from lower processing unit 13. Further, upper processing unit 11 instructs, as required, lower processing unit 13 to perform a process corresponding to the event for which the notification has been provided from lower processing unit 13.

Figure 8:
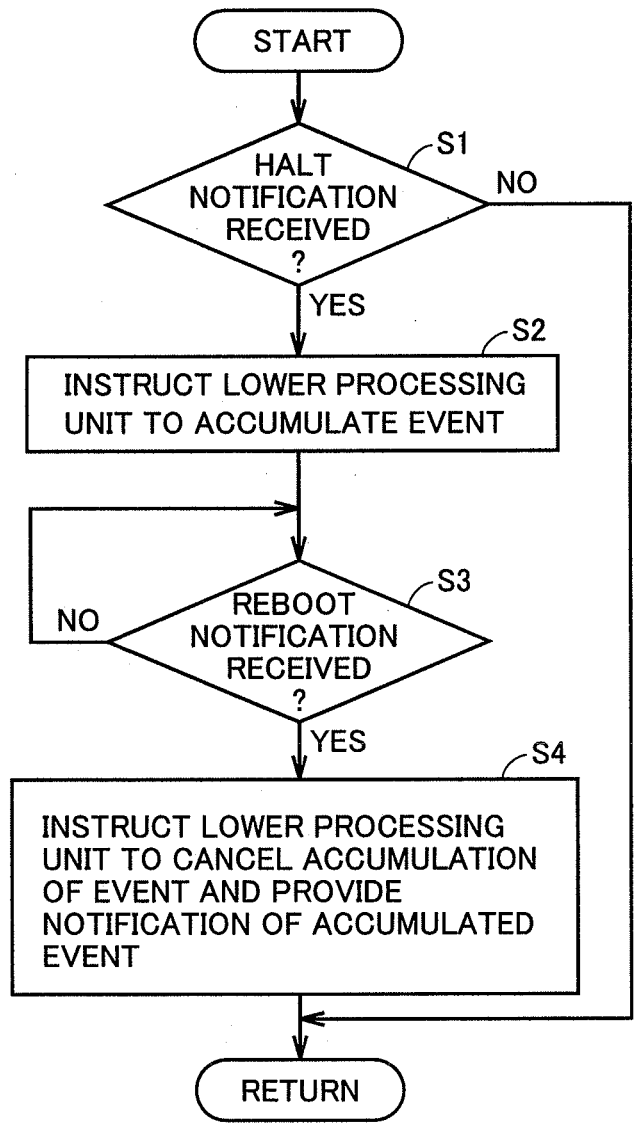
FIG. 8 is a flowchart illustrating a flow of a process by a matching unit shown in FIG. 7.

FIG. 8 is a flowchart illustrating a flow of the process of the matching unit shown in FIG. 7. The process shown in this flowchart is performed at a certain cycle, for example. Referring to FIG. 8, in a step S1, matching unit 14 determines whether or not a halt notification has been received from upper processing unit 11. When matching unit 14 has not received the halt notification from upper processing unit 11 (NO in step S1), the process illustrated below is skipped. When matching unit 14 has received the halt notification from upper processing unit 11 (YES in step S1), the process proceeds to a step S2.

In step S2, matching unit 14 instructs lower processing unit 13 to accumulate an event. In response to the instruction from matching unit 14, lower processing unit 13 accumulates an event for which a notification should be provided to upper processing unit 11. It should be noted that lower processing unit 13 updates its database whenever an event occurs.

In a step S3, matching unit 14 determines whether or not a reboot notification has been received from upper processing unit 11. When matching unit 14 has not received the reboot notification from upper processing unit 11 (NO in step S3), the process in step S3 is repeated. When matching unit 14 has received the reboot notification from upper processing unit 11 (YES in step S3), the process proceeds to a step S4.

In step S4, matching unit 14 instructs lower processing unit 13 to cancel the accumulation of event and provide a notification of the accumulated event. In response to the instruction from matching unit 14, basic communication unit 12 cancels the accumulation of event, and provides a notification of the accumulated event to upper processing unit 11. In accordance with the event for which the notification has been made, upper processing unit 11 updates its database.

As described above, according to the first embodiment, matching unit 14 accumulates, in lower processing unit 13, the event having occurred during the halt period of upper processing unit 11 (update period of the firmware). After passage of the halt period of upper processing unit 11, matching unit 14 causes lower processing unit 13 to provide a notification of the accumulated event to upper processing unit 11. Accordingly, after upper processing unit 11 is rebooted, the state managed by upper processing unit 11 (information stored in storage unit 21) can be matched with the state managed by lower processing unit 13 (information stored in storage unit 22). Accordingly, mismatch in management state between upper processing unit 11 and lower processing unit 13 can be prevented in advance.

Second Embodiment

Figure 9:
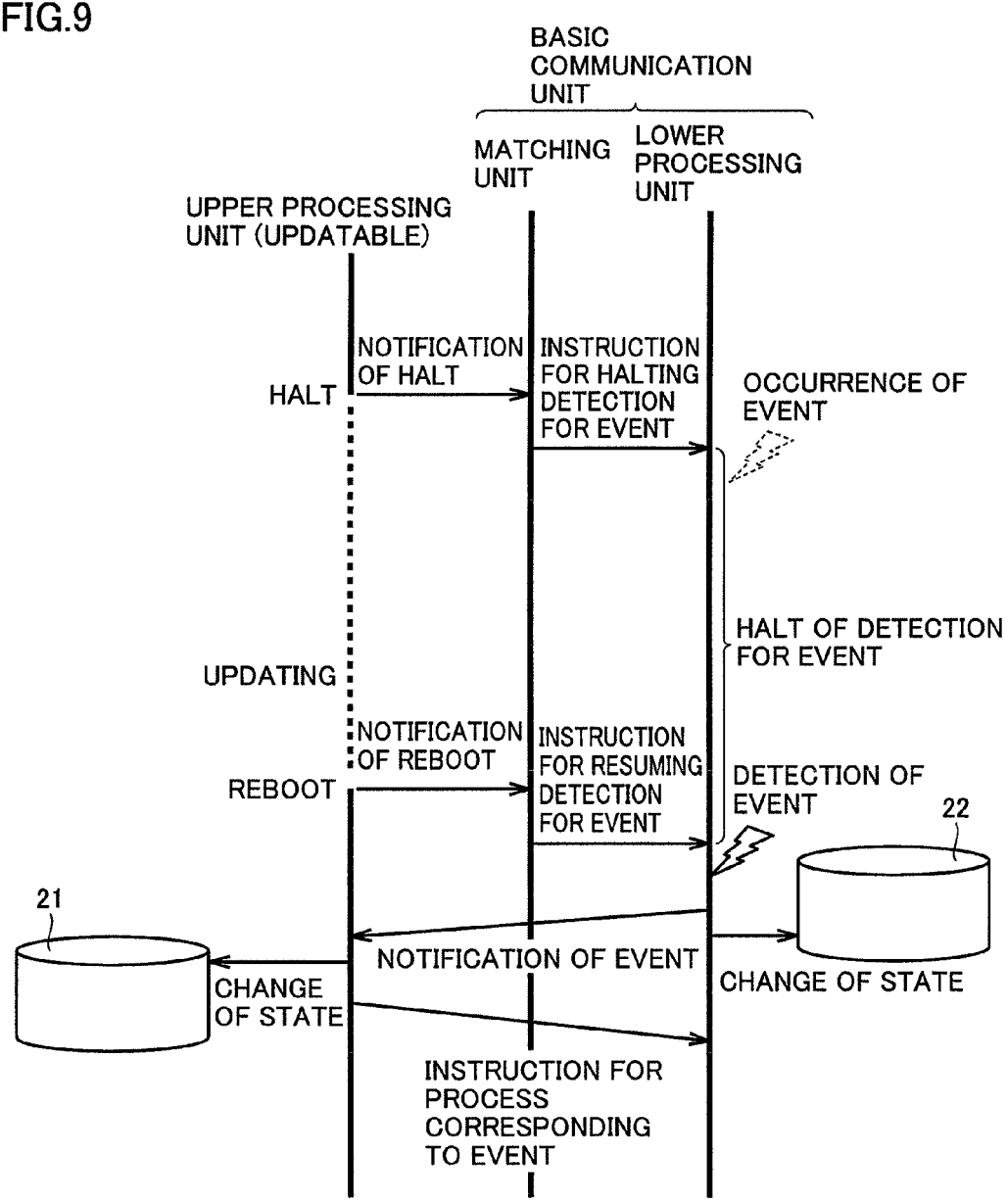
FIG. 9 is a sequence diagram for illustrating a process by the OLT according to a second embodiment.

FIG. 9 is a sequence diagram for illustrating a process by an OLT according to a second embodiment. Referring to FIG. 3 and FIG. 9, prior to halting the process, upper processing unit 11 provides a notification of halt of upper processing unit 11 to matching unit 14. With the notification from upper processing unit 11, matching unit 14 detects that upper processing unit 11 is to be halted. Accordingly, matching unit 14 instructs lower processing unit 13 to halt the detection for event. In accordance with the instruction from matching unit 14, lower processing unit 13 halts the detection for event.

The firmware of upper processing unit 11 is updated, and upper processing unit 11 is rebooted. Upper processing unit 11 notifies matching unit 14 that upper processing unit 11 has been rebooted. With the notification from upper processing unit 11, matching unit 14 detects that upper processing unit 11 has been rebooted. Accordingly, matching unit 14 instructs lower processing unit 13 to resume detection for event. In accordance with the instruction from matching unit 14, lower processing unit 13 resumes detection for event.

Figure 10:
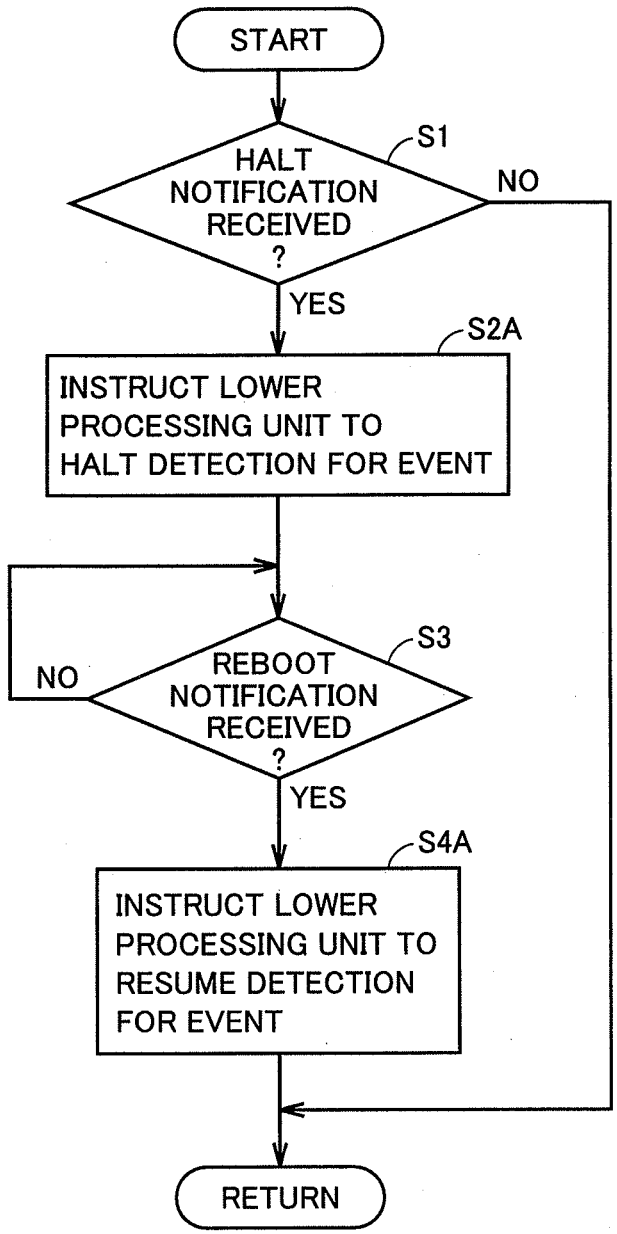
FIG. 10 is a flowchart illustrating a flow of the process by the matching unit shown in FIG. 9.

FIG. 10 is a flowchart illustrating a flow of the process by the matching unit shown in FIG. 9. The process shown in this flowchart is performed at a certain cycle, for example. Referring to FIG. 8 and FIG. 10, in the second embodiment, processes in steps S2A, S4A are performed respectively instead of the processes in steps S2, S4. When matching unit 14 has received a halt notification from upper processing unit 11 (YES in step S1), the process proceeds to step S2A.

In step S2A, matching unit 14 instructs lower processing unit 13 to halt detection for event. In response to the instruction from matching unit 14, lower processing unit 13 halts the detection for event.

In step S3, matching unit 14 determines whether or not a reboot notification has been received from upper processing unit 11. When matching unit 14 has received the reboot notification from upper processing unit 11 (YES in step S3), the process proceeds to step S4A.

In step S4A, matching unit 14 instructs lower processing unit 13 to resume detection for event. In response to the instruction from matching unit 14, lower processing unit 13 resumes detection for event.

According to the second embodiment, the detection for event by lower processing unit 13 is also halted while updating the firmware of upper processing unit 11. When an event occurs during this period, the event will be detected by lower processing unit 13 after rebooting upper processing unit 11. On this occasion, lower processing unit 13 provides a notification of the detected event to upper processing unit 11, and updates its database. In accordance with the notification from lower processing unit 13, upper processing unit 11 updates its database. Further, as required, upper processing unit 11 sends, to lower processing unit 13, an instruction for a process corresponding to the event for which the notification has been provided from lower processing unit 13.

Thus, according to the second embodiment, as with the first embodiment, even when upper processing unit 11 is temporarily halted, the state managed by upper processing unit 11 and the state managed by lower processing unit 13 can be matched with each other after the rebooting. In other words, according to the second embodiment, as with the first embodiment, mismatch in management state between upper processing unit 11 and lower processing unit 13 can be prevented in advance.

(Specific Example of Halting Detection for Event)

A first example of an event to be detected by lower processing unit 13 is an MPCP link down event. Lower processing unit 13 halts MPCP timeout monitoring, thereby halting detection for an MPCP link down event.

The MPCP timeout monitoring is performed in the following manner. OLT 101 periodically transmits an MPCP gate frame to ONU 102. Lower processing unit 13 monitors whether or not an MPCP frame (report), which is a response to the gate frame, is delivered from ONU 102 within a predetermined period. When the report is not sent from ONU 102 to OLT 101 within the predetermined period, lower processing unit 13 detects an MPCP link down event. In the case of the MPCP, this predetermined period is defined as 1 second.

A second example of an event to be detected by lower processing unit 13 is an OAM link down event. Lower processing unit 13 halts OAM timeout monitoring, thereby halting detection for an OAM link down event.

The OAM timeout monitoring is performed in the same manner as that in the MPCP timeout monitoring. In the case of the OAM, the timeout period is defined as 5 seconds.

A third example of an event to be detected by lower processing unit 13 is an MPCP link up event. Lower processing unit 13 halts detection for an MPCP link up event by halting transmission of a discovery frame.

OLT 101 regularly broadcasts a Discovery frame to all the ONUs in order to detect an ONU newly connected to PON line 104. The ONU newly connected to PON line 104 is not registered in OLT 101. Hence, a Register Request frame is sent from the ONU to OLT 101 so as to request registration of the ONU. OLT 101 provides an LLID to this ONU, and establishes a communication link with the ONU. The information of the ONU thus newly registered is registered in both the database of the upper processing unit 11 side and the database of the lower processing unit 13 side.

Third Embodiment

Figure 11:
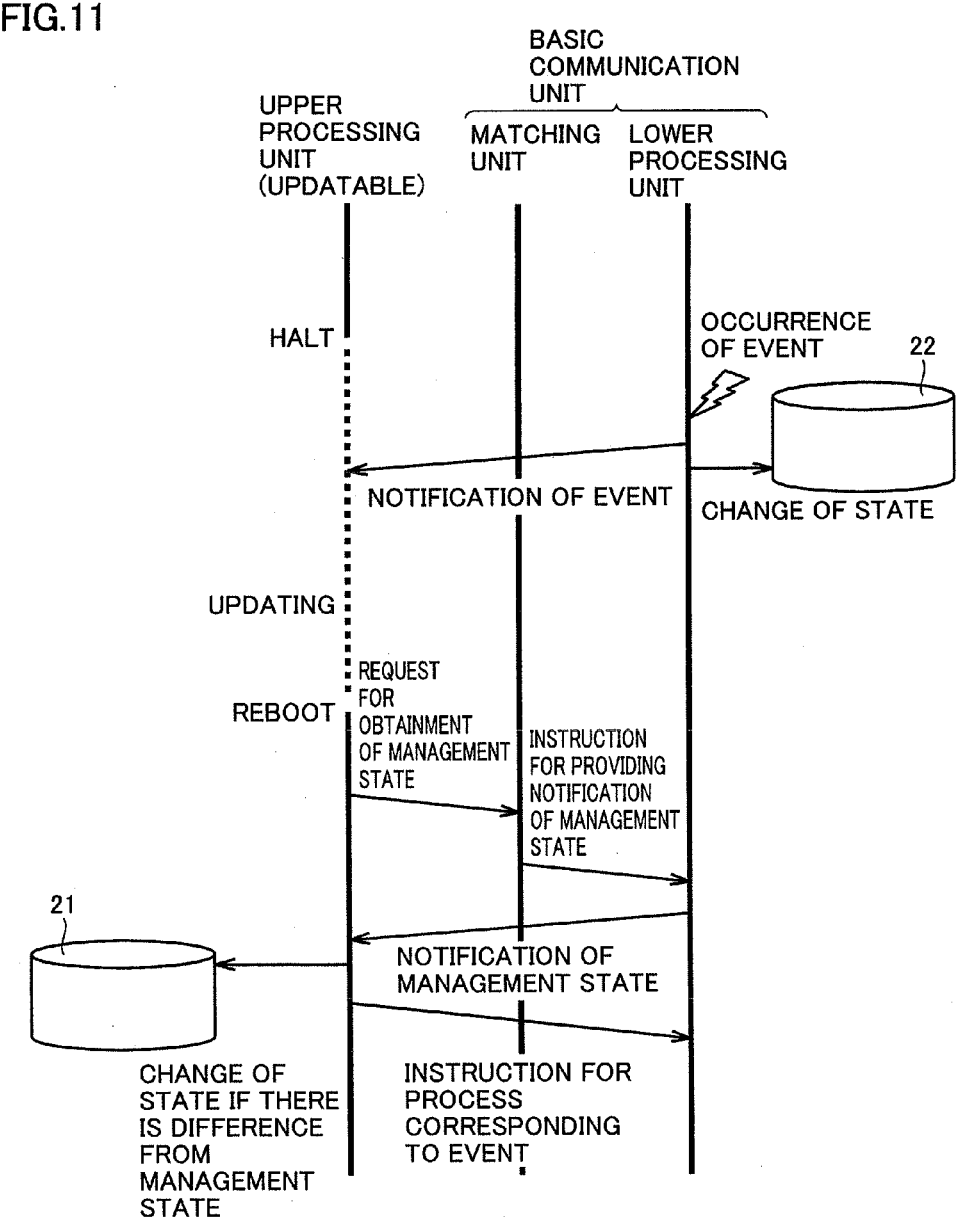
FIG. 11 is a sequence diagram for illustrating a process by the OLT according to a third embodiment.

FIG. 11 is a sequence diagram for illustrating a process of an OLT according to a third embodiment. Referring to FIG. 3 and FIG. 11, upper processing unit 11 halts a process in order to update the firmware. When an event occurs while updating the firmware of upper processing unit 11, lower processing unit 13 changes the management state stored in its database, and provides a notification of the event to upper processing unit 11. However, upper processing unit 11 does not receive the notification from lower processing unit 13 because the process by upper processing unit 11 is halted.

When the updating of the firmware is ended, upper processing unit 11 is rebooted. Next, upper processing unit 11 transmits a request for obtainment of management state to basic communication unit 12. When matching unit 14 receives the request for obtainment of management state from upper processing unit 11, matching unit 14 instructs lower processing unit 13 to provide a notification of the management state. In accordance with the instruction from matching unit 14, lower processing unit 13 provides upper processing unit 11 with a notification of the management state stored in its database (information stored in storage unit 22).

Upper processing unit 11 verifies the management state stored in its database (information stored in storage unit 22), against the management state for which the notification has been provided from lower processing unit 13. When there is a difference between the management states, upper processing unit 11 reflects the difference in its database. Accordingly, the state managed by upper processing unit 11 is matched with the state managed by lower processing unit 13.

Further, upper processing unit 11 instructs, as required, lower processing unit 13 to perform a process corresponding to the event.

Figure 12:
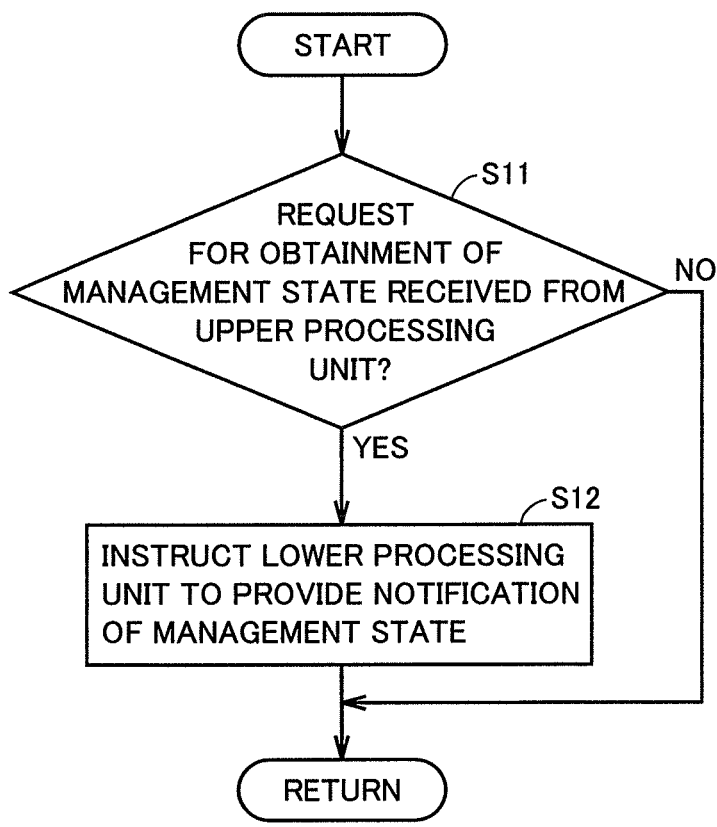
FIG. 12 is a flowchart illustrating a flow of a process by a matching unit shown in FIG. 11.

FIG. 12 is a flowchart illustrating a flow of the process by the matching unit shown in FIG. 11. The process shown in this flowchart is performed at a certain cycle, for example. Referring to FIG. 12, in a step S11, it is determined whether or not matching unit 14 has received the request for obtainment of management state from upper processing unit 11. When matching unit 14 has not received the request for obtainment of management state from upper processing unit 11 (NO in step S11), the process in step S12 is skipped.

When matching unit 14 receives the request for obtainment of management state from upper processing unit 11 (YES in step S11), the process in step S12 is performed. In step S12, matching unit 14 instructs lower processing unit 13 to provide a notification of the management state to upper processing unit 11. In response to the instruction from matching unit 14, lower processing unit 13 provides the notification of the management state stored in storage unit 22 to upper processing unit 11.

As described above, according to the third embodiment, after the rebooting, upper processing unit 11 transmits the request for obtainment of management state to basic communication unit 12. In accordance with the request for obtainment of management state from upper processing unit 11, matching unit 14 causes lower processing unit 13 to provide a notification of the management state to upper processing unit 11. Accordingly, according to the third embodiment, as with the first and second embodiments, after upper processing unit 11 is rebooted, the state managed by upper processing unit 11 (information stored in storage unit 21) can be matched with the state managed by basic communication unit 12 (information stored in storage unit 22).

Whenever an event occurs, basic communication unit 12 changes its management state. Hence, while updating the firmware of upper processing unit 11, the management state of upper processing unit 11 and the management state of basic communication unit 12 can be different from each other. According to the third embodiment, such a difference in management state can be eliminated.

As described above, the subscriber line terminal of the present invention is suitably applied to a communication network, such as a PON system, in which communication between an ONU and an OLT needs to be always maintained. The following describes two examples for exemplary utilization of the PON system according to the embodiment of the present invention.

Exemplary Utilization of PON System

First Example

Figure 13:
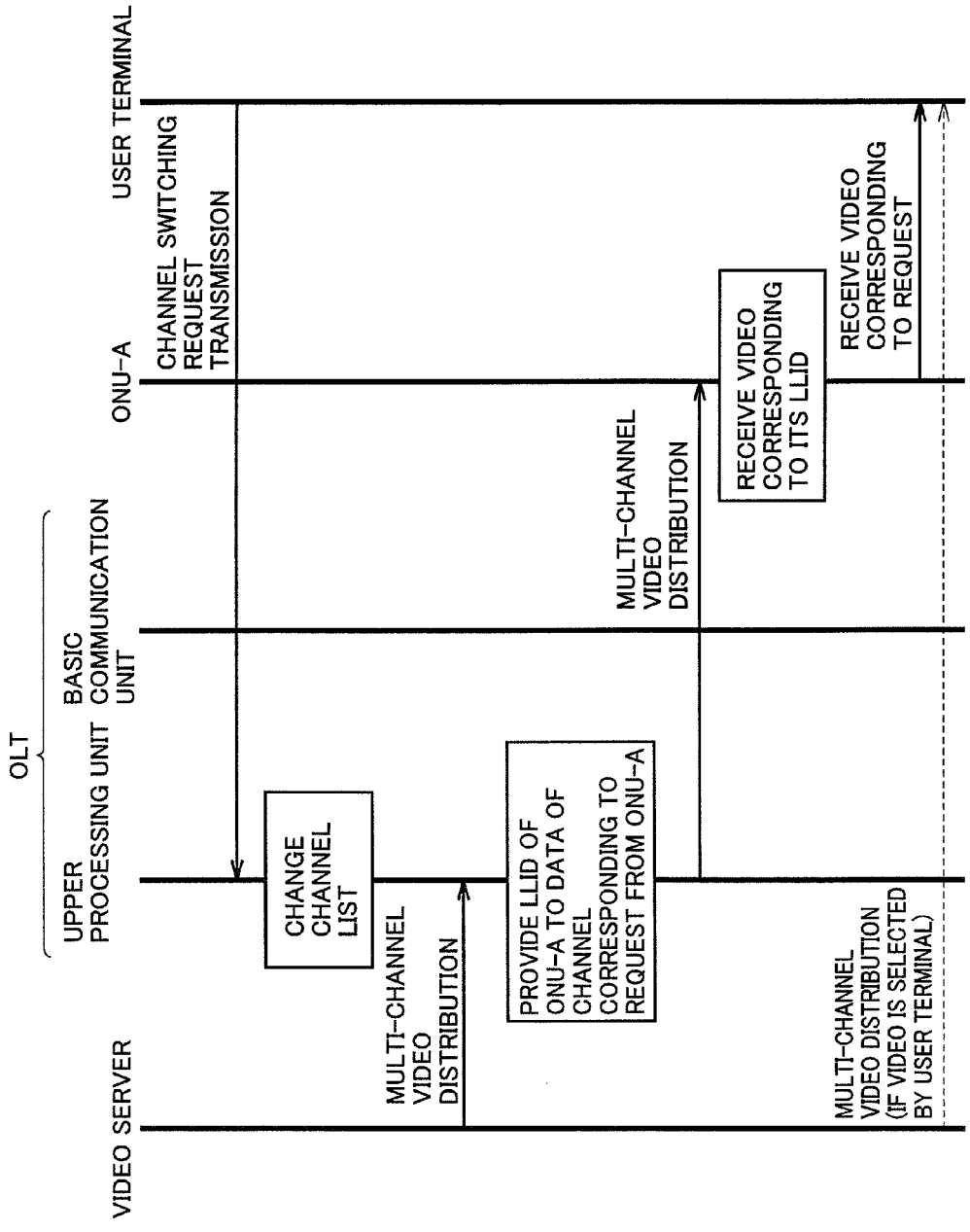
FIG. 13 is a sequence diagram for schematically illustrating multi-channel video distribution performed by the PON system according to the embodiment of the present invention.

The first example represents distribution of multi-channel video data. FIG. 13 is a sequence diagram for schematically illustrating a process for multi-channel video distribution performed by the PON system according to the embodiment of the present invention. Referring to FIG. 13, when the user switches viewing channels in the user terminal (for example, STB 111b shown in FIG. 2), a channel switching request is transmitted from the user terminal. This channel switching request is converted into an optical signal by an ONU (referred to as "ONU-A") of the user and is transmitted to OLT 101.

OLT 101 receives the channel switching request. In this case, the channel switching request is processed by upper processing unit 11. Specifically, in accordance with the channel switching request, upper processing unit 11 changes a channel list that associates the ONU and the viewing channel with each other.

Meanwhile, from the video server, multi-channel video data are distributed. In accordance with the above-described channel list, OLT 101 provides the LLID of ONU-A to the video data of the channel corresponding to the request from ONU-A. Then, OLT 101 distributes the multi-channel videos. The distribution of the video data from OLT 101 may be performed in an unicast manner or a multicast manner.

From among the multi-channel videos sent from OLT 101, ONU-A receives a video (data) having the LLID coinciding with the LLID of ONU-A. ONU-A transmits the received video to the user terminal. In this way, the user terminal can receive the video corresponding to the channel switching request.

If the user terminal selects the video data of the channel corresponding to the user's request, as indicated by an arrow of broken line in FIG. 13, the multi-channel video data sent from the video server is sent to the user terminal from the ONU via the home-side network. However, in many cases, the home-side network has a transmission capacity (for example, 100 Mbps) smaller than the transmission capacity (for example, 10 Gbps) of the PON line. Accordingly, when a large volume of data is transmitted to the home-side network, there can be an influence over the home-side network (such as delay of data transmission). OLT 101 (specifically, the upper processing unit) manages the ONU and the channel in association with each other, so that only the video data of the channel desired by the user is distributed to the home-side network. Accordingly, the above-described problem can be prevented.

Here, when data communication between the OLT and the ONU is lost due to updating of the firmware or the like, the video which the user is viewing on the television is interrupted, disadvantageously. However, according to the embodiment of the present invention, even when upper processing unit 11 is temporarily halted, the operation of basic communication unit 12 is continued. Accordingly, operations of the upper IF unit, communication processing unit 16, and optical IF unit 15 are also continued. Thus, the influence over the user's viewing on the video can be made small.

Figure 14:
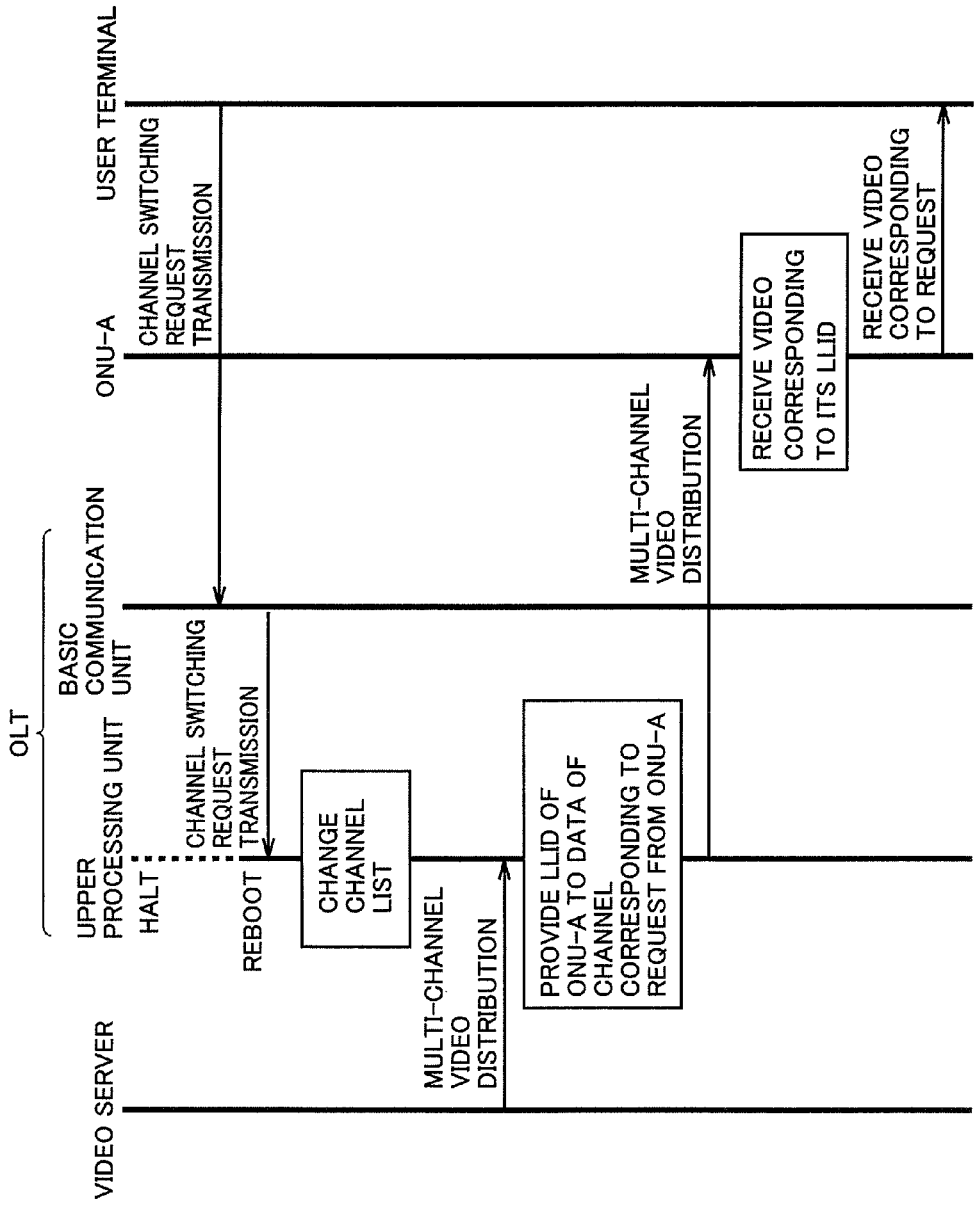
FIG. 14 is a sequence diagram for schematically illustrating multi-channel video distribution in the case where the process by the upper processing unit of the OLT is temporarily halted.

Further, when the user operates to switch channels, the video displayed on the user terminal needs to be switched to video of the new channel within a period appropriate for the user. It is considered that there is a possibility such that upper processing unit 11 is halted due to updating of the firmware when the user operates to switch the channels. As shown in FIG. 14, basic communication unit 12 receives a transmitted request from the ONU when upper processing unit 11 is temporarily halted. Then, when upper processing unit 11 is rebooted, basic communication unit 12 provides a notification of the request to upper processing unit 11. In this way, the same state can be attained as a state of a case where upper processing unit 11 receives the request during a period in which upper processing unit 11 can perform its process.

Thereafter, upper processing unit 11 performs the same process as the process shown in FIG. 13. Accordingly, the ONU having transmitted the channel switching request can receive the video data of the new channel. Further, by shortening the halt time (firmware update time) of upper processing unit 11, time lag from the user's operation for channel switching to actual channel switching on the terminal (TV) can be shortened.

Second Example

The second example represents an example in which the OLT simultaneously updates firmware of a plurality of ONUs. In a general access network, data needs to be transmitted to a plurality of ONUs individually. In contrast, in the PON system, when the OLT sends one data to the PON line, all the ONUs can receive the data. This function is implemented by the upper processing unit of the OLT.

Figure 15:
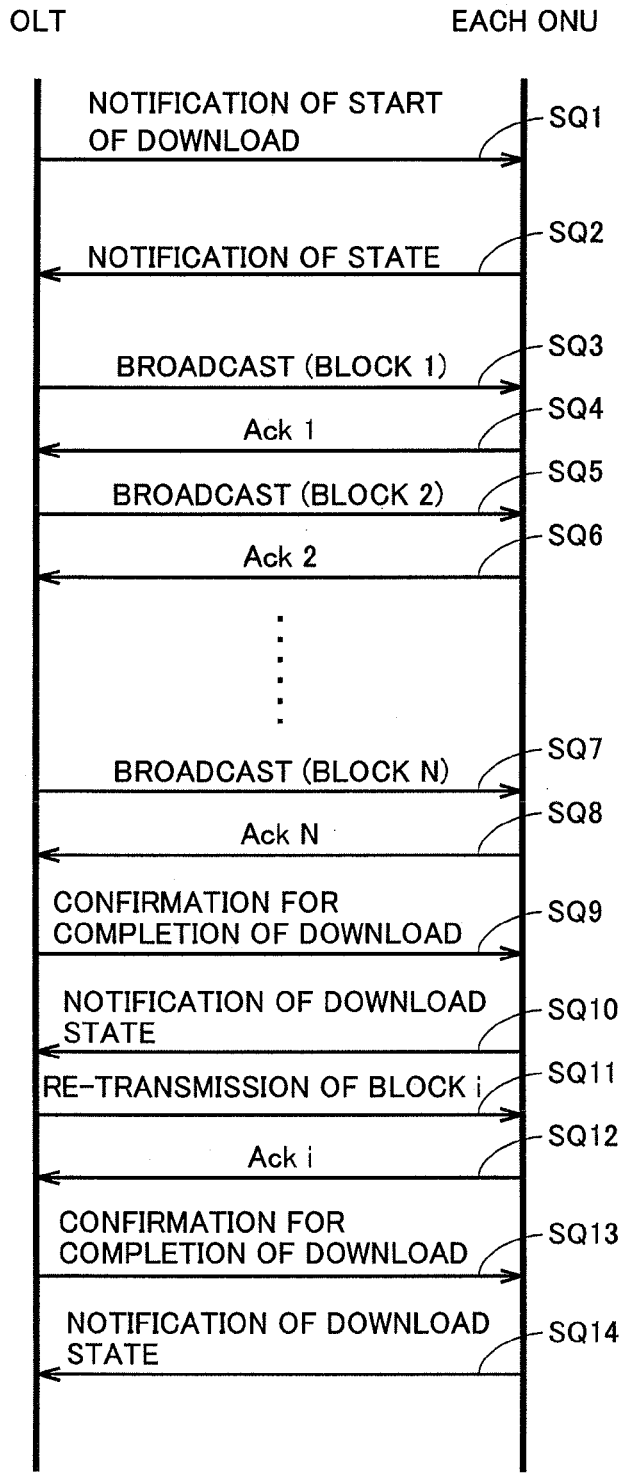
FIG. 15 is a sequence diagram showing a procedure of operation downloading data in the PON system according to the embodiment of the present invention.

FIG. 15 is a sequence diagram showing a procedure of operation of downloading data in the PON system according to the embodiment of the present invention. Here, the following describes a case where common management data is divided into N blocks.

Referring to FIG. 15, first, the OLT transmits a control frame to each ONU so as to provide a notification of "start of download" (SQ1).

Next, each of the ONUs receives, from the OLT, the control frame indicating "start of download", and transitions to a download state. Then, each of the ONUs transmits, to the OLT, a control frame indicating that the transition has been made to the download state (SQ2).

Next, the OLT receives, from each of the ONUs, the control frame indicating that the transition has been made to the download state, inserts a block 1 of the N blocks into the control frame, inserts a broadcast LLID into the control frame, and broadcasts it to each of the ONUs (SQ3).

Next, each of the ONUs receives the control frame including block 1 from the OLT, stores block 1, inserts an Ack (Acknowledge) 1 into the control frame so as to indicate that block 1 has been received normally, and transmits the control frame to the OLT (SQ4).

Next, the OLT receives the control frame including Ack1 from each of the ONUs, inserts a block 2 of the N blocks into the control frame, inserts a broadcast LLID into the control frame, and broadcasts it to each of the ONUs (SQ5).

Next, each of the ONUs receives the control frame including block 2 from the OLT, stores block 2, inserts an Ack2 into the control frame so as to indicate that block 2 has been received normally, and transmits the control frame to the OLT (SQ6).

Thereafter, the OLT and each of the ONUs repeat transmission and reception of blocks 3 to N−1. Then, the OLT broadcasts block N (SQ7). In response to this, each of the ONUs inserts an AckN into the control frame and transmits the control frame to the OLT (SQ8). Here, in the case where each of the ONUs has normally received all of block 1 to block N, each of the ONUs updates the management data.

Next, the OLT receives the control frame including the AckN from each of the ONUs, and transmits, to each of the ONUs, a control frame indicating an inquiry as to whether or not download of block 1 to block N has been normally completed (SQ9).

Next, each of the ONUs receives the control frame indicating the inquiry from the OLT, and transmits, to the OLT, a control frame indicating that download of block 1 to block N has been normally completed or has not been normally completed (SQ10).

Next, when the OLT receives, from each of the ONUs, a control frame indicating that download of block 1 to block N has been normally completed, the OLT ends the download process. On the other hand, when the OLT receives, from at least one ONU (hereinafter, referred to as "incomplete ONU"), a control frame indicating that download of block 1 to block N has not been completed normally, the OLT re-transmits a block i (i=1 to N), which has not been normally received by the incomplete ONU, to the incomplete ONU (SQ11).

Next, the incomplete ONU receives the control frame including block i from the OLT, stores block i, inserts an Acki into the control frame so as to indicate that block i has been received normally, and transmits it to the OLT (SQ12). Then, the incomplete ONU updates the management data.

Next, the OLT receives the control frame including the Acki from the incomplete ONU, and transmits, to the incomplete ONU, a control frame indicating an inquiry as to whether or not download of block 1 to block N has been normally completed (SQ13).

Next, each of the ONUs including the incomplete ONU receives the control frame indicating the inquiry from the OLT, and transmits, to the OLT, a control frame indicating that download of block 1 to block N has been normally completed (SQ14).

Then, when the OLT receives, from each of the ONUs, the control frame indicating that download of block 1 to block N has been normally completed, the OLT ends the download process.

Figure 16:
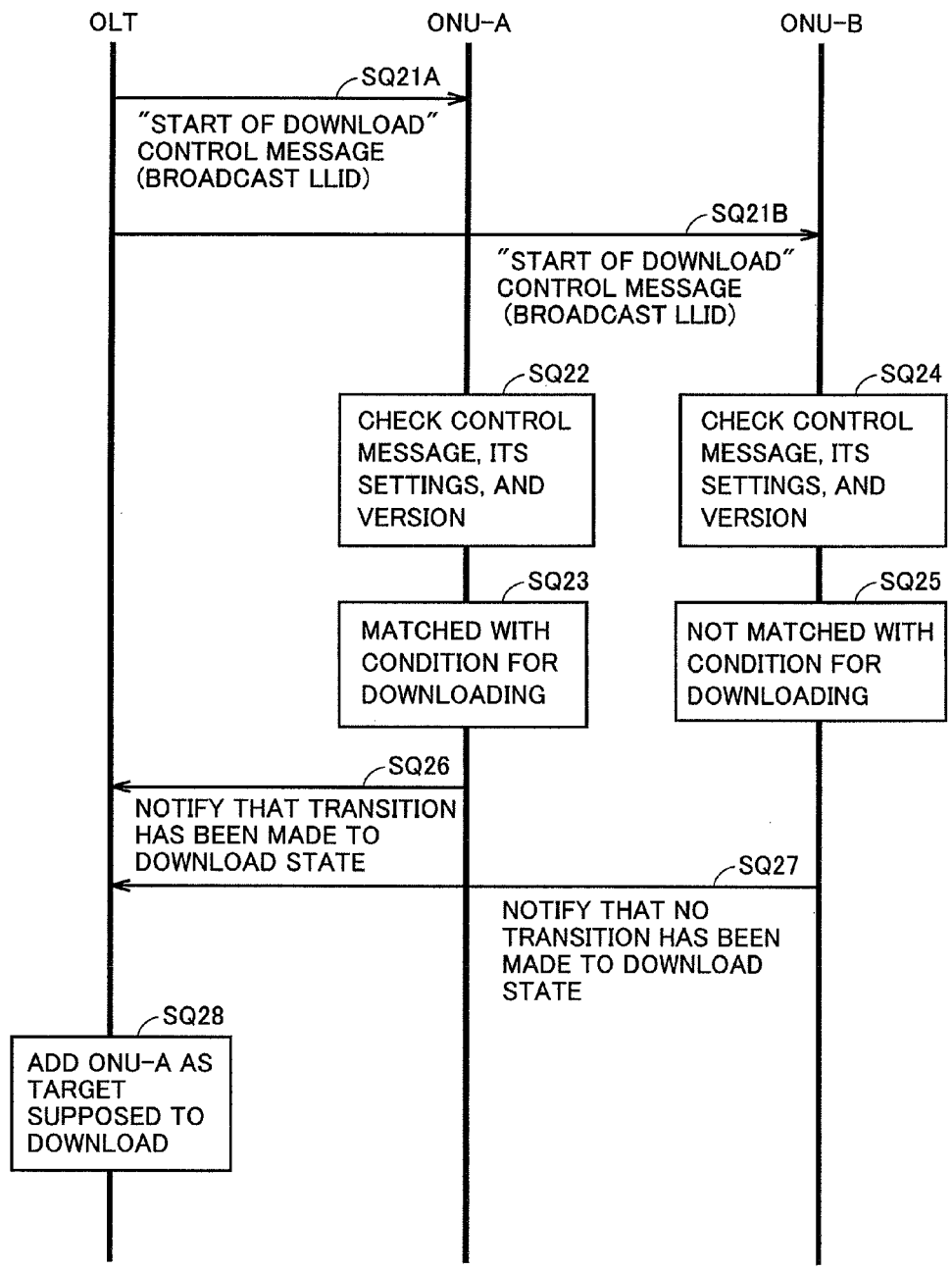
FIG. 16 is a sequence diagram showing a procedure of preparation operation before starting broadcast in the PON system according to the embodiment of the present invention.

FIG. 16 is a sequence diagram showing a procedure of preparation operation before starting broadcast in the PON system according to the embodiment of the present invention. FIG. 16 corresponds to the operations of sequences SQ1 and SQ2 shown in FIG. 15. Here, the following describes a case where the OLT communicates with two ONUs (ONU-A and ONU-B).

In the ONUs that communicate with one OLT, i.e., that are connected to one OLT, manufacturing makers, software versions, and hardware versions may be different from each other. Accordingly, not all the ONUs are supposed to download the same management data.

Hence, before broadcasting common management data to each of the ONUs, the OLT recognizes an ONU that should download the common management data, i.e., a target ONU supposed to download it. First, the OLT generates a control message to provide a notification of "start of download", inserts it in a control frame, inserts a broadcast LLID in the control frame, and broadcasts it to ONU-A and ONU-B (SQ21A and SQ21B).

This control message includes not only the notification of "start of download" but also a type of common management data. Examples of the type of common management data include: the name of manufacturing maker, software version, and hardware version of a target ONU supposed to download. Other examples of the type of common management data include: a type of target device supposed to download, i.e., information regarding whether the common management data is a software program for a CPU or the like, data for FPGA, or operation instruction information. Further examples of the type of common management data include: the version of common management data, the size of common management data, the size of a divided block of common management data, and the date of common management data.

Next, each of ONU-A and ONU-B checks the control message included in the control frame received from the OLT, and its settings and version. In other words, the ONU compares the type of the common management data indicated by the control message with its settings and version, and determines whether or not the ONU satisfies the condition for downloading the common management data (SQ22 and SQ24).

When ONU-A determines that ONU-A satisfies the condition for downloading, i.e., when ONU-A determines that this common management data should be downloaded (SQ23), ONU-A transitions to the download state, and transmits a control frame to the OLT so as to indicate that transition has been made to the download state (SQ26).

When ONU-B determines that ONU-B does not satisfy the condition for downloading (SQ25), ONU-B does not transition to the download state, and transmits a control frame to the OLT so as to indicate that no transition has been made to the download state (SQ27).

Next, the OLT receives, from ONU-A, the control frame indicating that ONU-A has transitioned to the download state and receives, from ONU-B, the control frame indicating that ONU-B has not transitioned to the download state. Then, the OLT stores the identification number, for example, unicast LLID of ONU-A thus brought in the download state, i.e., adds ONU-A as a target ONU supposed to download. This identification number thus stored will be used in a below-described download completion confirming process (SQ28).

Figure 17:
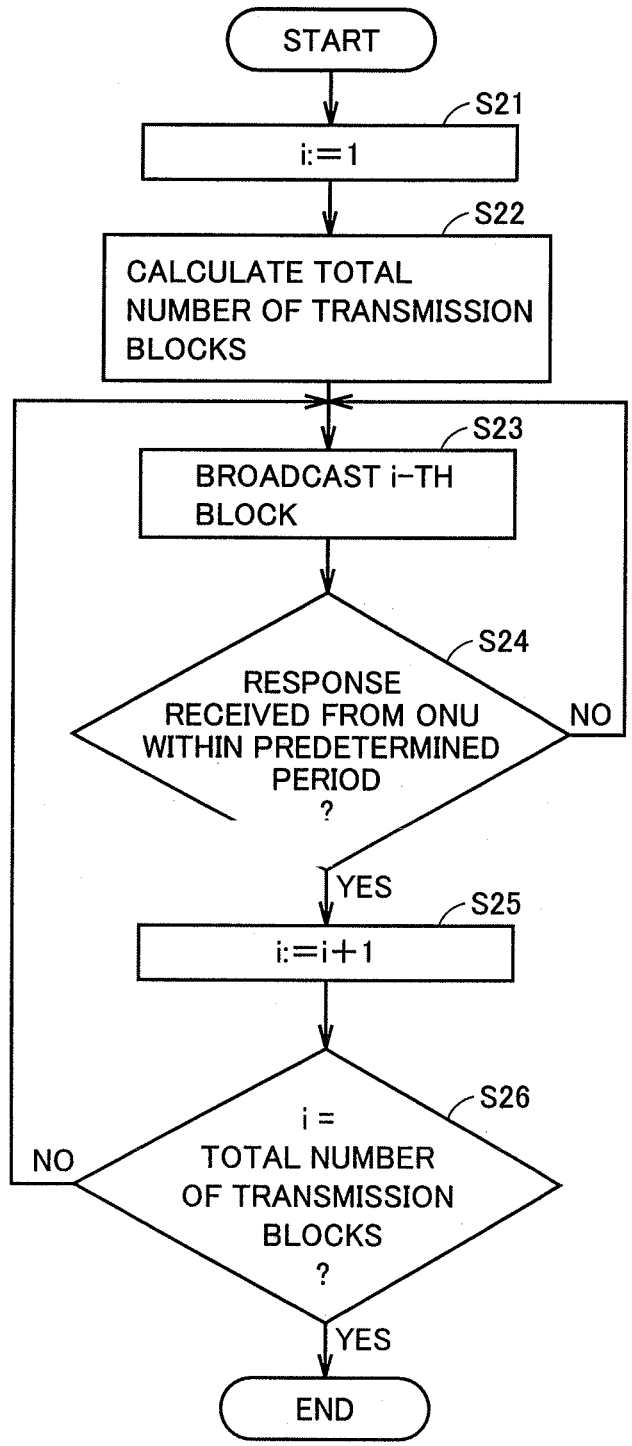
FIG. 17 is a flowchart defining a procedure of operation when the OLT performs broadcasting in the PON system according to the embodiment of the present invention.

FIG. 17 is a flowchart defining a procedure of operation when the OLT performs broadcasting in the PON system according to the embodiment of the present invention. FIG. 17 corresponds to the operations of sequences SQ3, SQ5, and SQ7 shown in FIG. 15. This flowchart shows how the OLT transmits a next block in accordance with a response of the ONU to transmission of a block of common management data.

Referring to FIG. 17, first, the OLT sets variable i=1 (S21).

Next, the OLT calculates the total number of transmission blocks, i.e., calculates the number of divided blocks of the common management data (S22).

Next, the OLT broadcasts the i-th block to each of the ONUs (S23).

Next, when the OLT receives a response (Ack) from each of the ONUs within a predetermined period from the broadcasting of the block (YES in S24), the OLT sets variable i=i+1 (S25).

Next, when variable i does not reach the total number of transmission blocks (NO in S26), the OLT broadcasts the i-th block to each of the ONUs, i.e., broadcasts the next block (S23).

Further, when the OLT receives no response from each of the ONUs within the predetermined period from the broadcasting of the block (NO in S24), the OLT re-transmits the same block (S23).

When variable i reaches the total number of transmission blocks (YES in S26), the OLT ends the broadcasting process.

Figure 18:
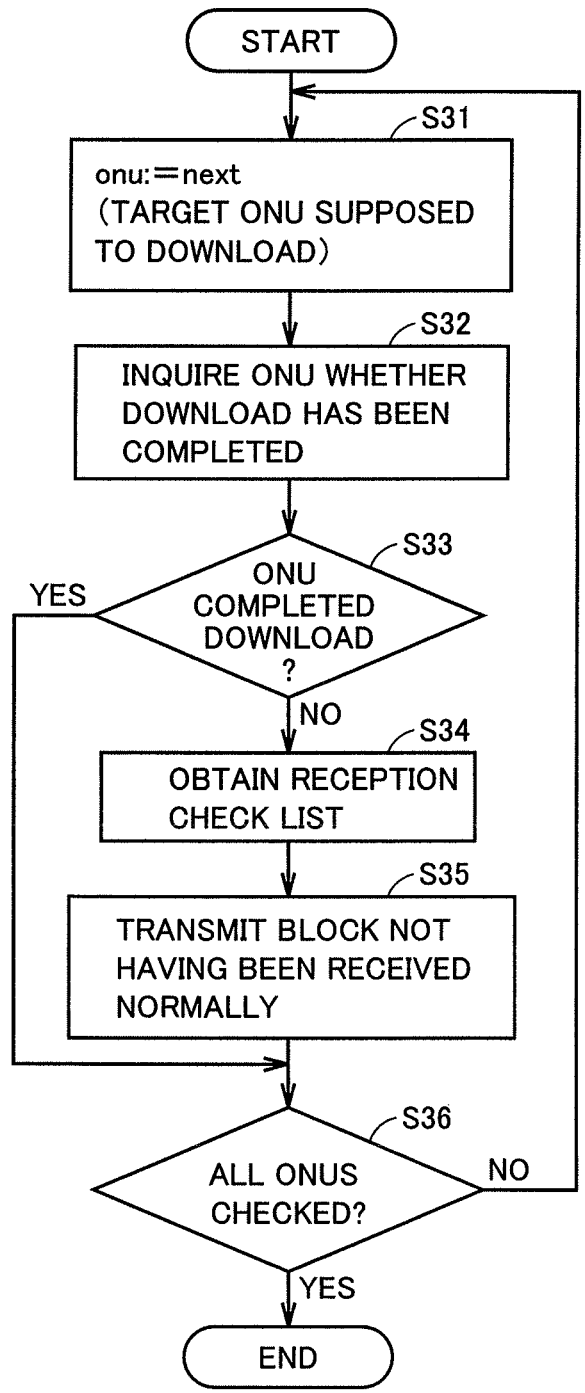
FIG. 18 is a flowchart defining a procedure of operation when the OLT confirms completion of download in the PON system according to the embodiment of the present invention.

FIG. 18 is a flowchart defining a procedure of operation when the OLT confirms completion of download in the PON system according to the embodiment of the present invention. FIG. 18 corresponds to the operations of sequences SQ9 to SQ14 shown in FIG. 15.

Referring to FIG. 18, the OLT selects any one of target ONUs that are supposed to download and that are recognized by the operation shown in FIG. 16, and substitutes the identification number, for example, unicast LLID of the selected ONU into a variable onu (S31).

Next, the OLT inquires the selected ONU whether or not download has been completed. Namely, the OLT inserts LLID of variable onu in the control frame indicating the inquiry as to whether or not download of common management data has been completed normally, and transmits it to the PON line (S32).

Next, in the case where the OLT receives, from the selected ONU, a response indicating that download has been completed (YES in S33) and where the OLT confirms that each of the target ONUs supposed to download has completed the download (YES in S36), the OLT ends the download completion confirming process.

Meanwhile, in the case where the OLT receives, from the selected ONU, a response indicating that download has been completed (YES in S33) and where there is an ONU not confirmed to have completed the download among the target ONUs supposed to download (NO in S36), the OLT selects the ONU not confirmed, and substitutes the identification number, for example, unicast LLID of the selected ONU into variable onu (S31).

Further, when the OLT receives, from the selected ONU, a response indicating that the download has not been completed (NO in S33), based on a "reception check list" obtained from the ONU, the OLT checks which one of the blocks has not been normally received, and transmits, to the ONU, the block having not been normally received. Specifically, the OLT inserts, into the control frame, the block not having been received normally, and inserts unicast LLID of the ONU into the control frame, and transmits it to the PON line (S35), and performs a process of a step S36.

In this way, once the OLT has transmitted all of the blocks, the OLT confirms whether or not each of the ONUs has completed the download. If not completed, the OLT individually re-transmits a block not having been received normally to the ONU.

With such a configuration, even when a block is lost in the transmission path from the OLT to an ONU, the download by the ONU can be completed.

For example, during the process described above, the upper processing unit may temporarily halt its process. Also in the second example, during a period in which the upper processing unit cannot perform the process, a message that should have been received by the upper processing unit is received by the basic communication unit, instead. After rebooting the upper processing unit, the basic communication unit transmits the message to the upper processing unit.

It should be noted that in each of the above-described embodiments, upper processing unit 11 provides notifications to basic communication unit 12 when halting its process and when rebooting upper processing unit 11. Accordingly, basic communication unit 12 (matching unit 14) can detect the halting and rebooting of upper processing unit 11. Alternatively, basic communication unit 12 may detect the start of updating the firmware of upper processing unit 11, in response to interruption of communication with upper processing unit 11 (for example, closure of session when communicating in accordance with TCP/IP). Thus, in this case, basic communication unit 12 may detect the rebooting of upper processing unit 11 in response to resuming of communication with upper processing unit 11.

Further, according to the configuration of FIG. 3, matching unit 14 is configured as a portion of basic communication unit 12. Alternatively, matching unit 14 may be provided separately from basic communication unit 12.

Further, in each of the above-described embodiments, the updating of the firmware and the rebooting of the OLT are illustrated as examples of temporary halt of the process of the subscriber line terminal. However, the present invention is not limited to the updating of the firmware, and can be applied to an OLT including an upper processing unit which may temporarily halt its process, as well as a PON system including such an OLT.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

11: upper processing unit; 12: basic communication unit; 13: lower processing unit; 14: matching unit; 15: optical interface unit; 16: communication processing unit; 18: upper interface unit; 21, 22: storage unit; 31: CPU; 32: control LSI; 33: optical transmission/reception circuit; 34, 36: nonvolatile memory; 35, 37: RAM; 38: transmission/reception circuit; 39: management interface; 100: PON system; 101: OLT; 102-1 to 102-2: ONU; 104: PON line; 105: splitter; 109: upper network; 110: home-side network; 111: user terminal; 111a: personal computer; 111b: set top box; 111c: television receiver; 111d: telephone; 111e: connection device; 112: video distribution server; 115: network.

The invention claimed is:

1. A subscriber line terminal forming a network system together with a home-side device, comprising:
    an upper layer processing unit handling an upper layer of a hierarchical communication protocol, having a first storage unit for storing a first state of said network system, and updating the first state of said network system stored in said first storage unit when a notification of an event having occurred in said network system is provided; and a lower layer processing unit handling a lower layer of said hierarchical communication protocol, having a second storage unit for storing a second state of said network system, providing the notification of said event to said upper layer processing unit when detecting occurrence of said event, and updating the second state of said network system stored in said second storage unit based on said event, said second state may be different from said first state, said upper layer processing unit can be temporarily halted whereas said lower layer processing unit is configured to maintain an operation thereof even when said upper layer processing unit is temporarily halted, said subscriber line terminal further comprising a matching unit matching the first state stored in said first storage unit with the second state stored in said second storage unit after a halt period of said upper layer processing unit when said event occurs during the halt period of said upper layer processing unit.

2. The subscriber line terminal according to claim 1, wherein when said upper layer processing unit is temporarily halted, said matching unit sends an instruction to said lower layer processing unit so as to accumulate said event having occurred during said halt period of said upper layer processing unit, and after said halt period of said upper layer processing unit, said matching unit sends an instruction to said lower layer processing unit so as to provide said upper layer processing unit with the notification of said event accumulated.

3. The subscriber line terminal according to claim 1, wherein when said upper layer processing unit is temporarily halted, said matching unit sends an instruction to said lower layer processing unit so as to halt detection for said event, and after said halt period of said upper layer processing unit, said matching unit sends an instruction to said lower layer processing unit so as to resume the detection for said event.

4. The subscriber line terminal according to claim 1, wherein after said halt period of said upper layer processing unit, said matching unit sends an instruction to said lower layer processing unit so as to provide said upper layer processing unit with a notification of the state of said network system stored in said second storage unit.

5. The subscriber line terminal according to claim 1, wherein said network system is a passive optical network system, a protocol of said lower layer is MPCP (Multipoint MAC Control Protocol) or OAM (Operations, Administrations, and Maintenance), and said upper layer is higher than said lower layer in a hierarchy of said hierarchical communication protocol.

6. The subscriber line terminal according to claim 5, wherein when said lower layer processing unit provides said upper layer processing unit with the notification of said event that another home-side device has been additionally connected to said network system, said upper layer processing unit instructs said lower layer processing unit to establish a communication link between said subscriber line terminal and said another home-side device.

7. The subscriber line terminal according to claim 1, wherein said subscriber line terminal distributes multi-channel video data, which is received via an upper network, to the home-side device, and said upper layer processing unit receives, from said home-side device, a request for selecting video data of one channel from said multi-channel video data, and performs a process of including said home-side device as a distribution destination of said video data of the one channel.

8. The subscriber line terminal according to claim 1, wherein said halt period includes a period for updating firmware embedded in said upper layer processing unit to new firmware.

9. A control method for managing a network system in a subscriber line terminal, comprising the steps of:

performing an upper layer process regarding an upper layer of a hierarchical communication protocol;

performing a lower layer process regarding a lower layer of said hierarchical communication protocol; and providing a notification of an event having occurred in said network system from a lower layer processing unit, which performs said lower layer process, to a higher layer processing unit, which performs said upper layer process, said lower layer process, said upper layer process, and the notification of said event being performed during a period in which said upper layer process is able to be performed, the control method further comprising the step of performing said lower layer process during a period in which said upper layer process is not able to be performed, and after start of a period in which said upper layer process is able to be performed, attaining the same state as a state of a case where said upper layer process and the notification of said event are performed during the period.

10. A control method for a PON (Passive Optical Network) system formed of a subscriber line terminal and a plurality of home-side devices connected to said subscriber line terminal via a passive optical network, comprising the steps of:

at least one of said plurality of home-side devices transmitting, to said subscriber line terminal, a request for selecting video data of one channel from multichannel video data distributed from said subscriber line terminal to said passive optical network;

an upper layer processing unit of said subscriber line terminal receiving said request;

including the home-side device having transmitted said request, as a distribution destination of said video data of the one channel among the multi-channel video data sent from an upper network to said subscriber line terminal;

said subscriber line terminal distributing said multi-channel video data to said passive optical network;

said home-side device having transmitted said request selectively receiving said video data of the one channel corresponding to said request from among said multi-channel video data; and when said request is generated during a period in which said upper layer processing unit is not able to receive said request, a lower layer processing unit of said subscriber line terminal receiving the request generated, and after start of a period in which said upper layer processing unit is able to receive said request, said lower layer processing unit attaining the same state as a state of a case where said upper layer processing unit receives the request generated.

* * * * *